(12) United States Patent
Hiraike

(10) Patent No.: US 8,760,682 B2
(45) Date of Patent: Jun. 24, 2014

(54) JOB PROCESSING APPARATUS, CONTROL METHOD THEREFOR, AND COMPUTER-READABLE STORAGE MEDIUM

(75) Inventor: Kou Hiraike, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 12/361,338

(22) Filed: Jan. 28, 2009

(65) Prior Publication Data

US 2009/0195822 A1 Aug. 6, 2009

(30) Foreign Application Priority Data

Feb. 5, 2008 (JP) .................................. 2008-025734

(51) Int. Cl.
*G06F 3/12* (2006.01)

(52) U.S. Cl.
USPC ............... 358/1.15; 358/1.9; 358/405; 726/2; 726/3; 726/4; 709/201; 709/205

(58) Field of Classification Search
USPC ........ 358/1.13–1.15, 1.9, 400–407, 500, 504; 726/2, 3, 4, 5, 6, 7; 709/201, 205
See application file for complete search history.

(56) References Cited

U.S. PATENT DOCUMENTS

| | | | |
|---|---|---|---|
| 6,157,465 A * | 12/2000 | Suda et al. | 358/407 |
| 2002/0161740 A1* | 10/2002 | Nakamura et al. | 707/1 |
| 2003/0086111 A1* | 5/2003 | Akiyoshi | 358/1.14 |
| 2004/0193717 A1* | 9/2004 | Tajima et al. | 709/228 |
| 2005/0073709 A1* | 4/2005 | Kujirai et al. | 358/1.14 |
| 2005/0243364 A1* | 11/2005 | Sakai | 358/1.15 |

FOREIGN PATENT DOCUMENTS

| | | |
|---|---|---|
| JP | H08-251319 A | 9/1996 |
| JP | 2007-005899 A | 1/2007 |

OTHER PUBLICATIONS

Japanese Office Action for JP 2008-025734 dated Jun. 1, 2012.

* cited by examiner

*Primary Examiner* — King Poon
*Assistant Examiner* — Jamares Q Washington
(74) *Attorney, Agent, or Firm* — Carter, DeLuca, Farrell & Schmidt LLP

(57) ABSTRACT

A job processing apparatus which processes job data in cooperation with another job processing apparatus is provided. The job processing apparatus comprises an analysis unit configured to analyze a processing status of predetermined job data, and a determination unit configured to determine, in accordance with the analyzed processing status, whether the job processing apparatus has an operation authority to the job data. The job processing apparatus also comprises a prohibition unit configured to prohibit an operation of the job data when the job processing apparatus is determined not to have the operation authority.

8 Claims, 19 Drawing Sheets

JOB PROCESSING APPARATUS, CONTROL METHOD THEREFOR, AND COMPUTER-READABLE STORAGE MEDIUM

BACKGROUND OF THE INVENTION

1. Field of the Invention

The present invention relates to a job processing apparatus which processes job data in cooperation with another job processing apparatus, a control method therefor, and a computer-readable storage medium.

2. Description of the Related Art

There has conventionally been proposed a job processing apparatus which processes job data in cooperation with another job processing apparatus. For example, a given job processing apparatus transmits image data obtained by scanning an original by its scanner to another job processing apparatus. The printer of the receiving job processing apparatus prints the image data, or the printers of the two job processing apparatuses print the image data. These functions are called remote copying or cascade copying, which allows printing at a remote place or parallel-printing to shorten the print time.

Japanese Patent Laid-Open No. 08-251319 proposes a method of distributing the original images of respective pages from a master printing apparatus to slave printing apparatuses, and printing the distributed original images by the slave printing apparatuses.

Some of printing apparatuses which execute the cooperative operation have a function of displaying a list of print data on the display device of a print data transmitting or receiving printing apparatus, prompting the operator to perform a data operation such as printing cancellation, printing stop, printing resume, or printing interruption.

However, in the conventional technique if both transmitting and receiving cooperative apparatuses execute data operations, the following trouble may occur. That is, when the transmitting and receiving apparatuses simultaneously perform data operations, the data may change to a state the users of the two apparatuses do not want.

SUMMARY OF THE INVENTION

The present invention enables realization of a job processing apparatus which, when a plurality of job processing apparatuses process job data in cooperation with each other, prevents a trouble caused by contention of operations for the job data by the job processing apparatuses, a control method therefor, and a computer-readable storage medium.

One aspect of the present invention provides a job processing apparatus which processes job data in cooperation with another job processing apparatus, the job processing apparatus comprises: an analysis unit configured to analyze a processing status of predetermined job data; a determination unit configured to determine, in accordance with the analyzed processing status, whether the job processing apparatus has an operation authority to the job data; and a prohibition unit configured to prohibit an operation of the job data when the job processing apparatus is determined not to have the operation authority.

Another aspect of the present invention provides a method of controlling a job processing apparatus which processes job data in cooperation with another job processing apparatus, the method comprises: analyzing a processing status of predetermined job data; determining, in accordance with the analyzed processing status, whether the job processing apparatus has an operation authority to the job data; and prohibiting an operation of the job data when the job processing apparatus is determined not to have the operation authority.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
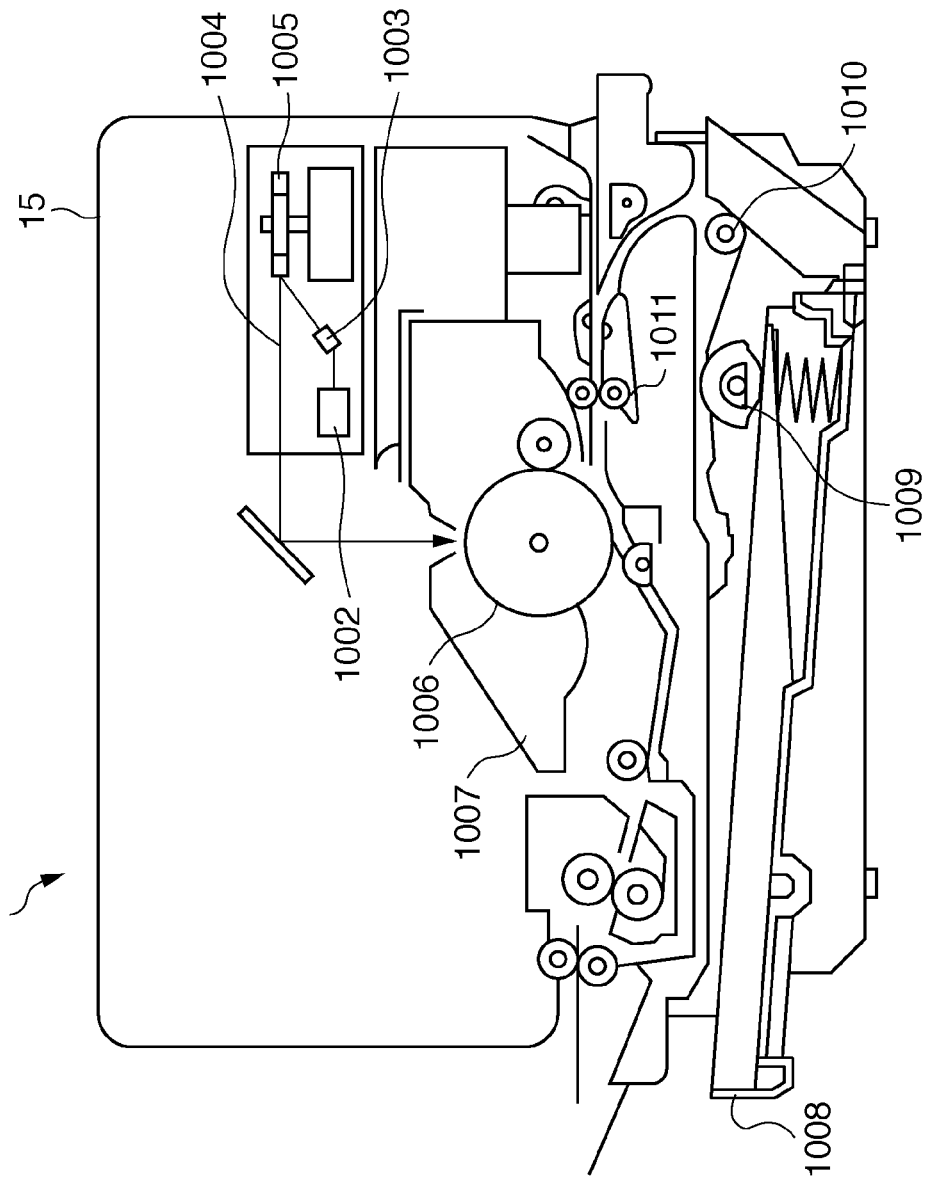
FIG. 1 is a sectional view showing a printing apparatus according to the first embodiment.

A first embodiment will be described with reference to FIGS. 1 to 16. FIG. 1 is a sectional view showing a printing apparatus as an example of a job processing apparatus according to the first embodiment. The embodiment will exemplify a multi function peripheral (MFP) as the printing apparatus. A laser beam printing apparatus will be explained, but the printing apparatus may also be a printer of another type such as an inkjet printer, sublimation printer, or silver halide printer. The embodiment will explain an MFP having copy, scanner, facsimile, and print functions, but the present invention is also applicable to a printing apparatus (SFP: Single Function Peripheral) having only a single function. The present invention is not limited to an apparatus which executes a print job, but is also applicable to an apparatus which executes jobs other than a print job as long as a plurality of job processing apparatuses process job data in cooperation with each other. For example, the present invention is applicable to a system in which image data obtained by scanning by the scanner of one apparatus is transmitted to a designated destination by using the transmission function (e.g., e-mail or facsimile) of another apparatus.

A multi function peripheral 10 includes a print engine 15, a pickup roller 1009, conveyance rollers 1010 and 1011, and a print paper cassette 1008. The print engine 15 includes a laser driver 1002, semiconductor laser 1003, rotating polygon mirror 1005, electrostatic drum 1006, and developing unit 1007. Reference numeral 1004 denotes a laser beam.

The operation of each component included in the multi function peripheral 10 in printing will be explained. When print processing starts, input print data is converted into a video signal, and the video signal is output to the laser driver 1002. The laser driver 1002 is a circuit for driving the semiconductor laser 1003, and switches the ON/OFF state of the laser beam 1004 emitted by the semiconductor laser 1003 in accordance with an input video signal. The laser beam 1004 is oscillated horizontally by the rotating polygon mirror 1005 to scanning-expose the surface of the electrostatic drum 1006, forming the electrostatic latent image of an output image on the electrostatic drum 1006. The electrostatic latent image is developed by the developing unit 1007 arranged around the electrostatic drum 1006, and then is transferred onto a print sheet. Print sheets are stored in the print paper cassette 1008. Each print sheet is fed into the apparatus by the pickup roller 1009 and conveyance rollers 1010 and 1011, and supplied to the position of the electrostatic drum 1006. Then, an image is printed onto the print sheet.

Figure 2:
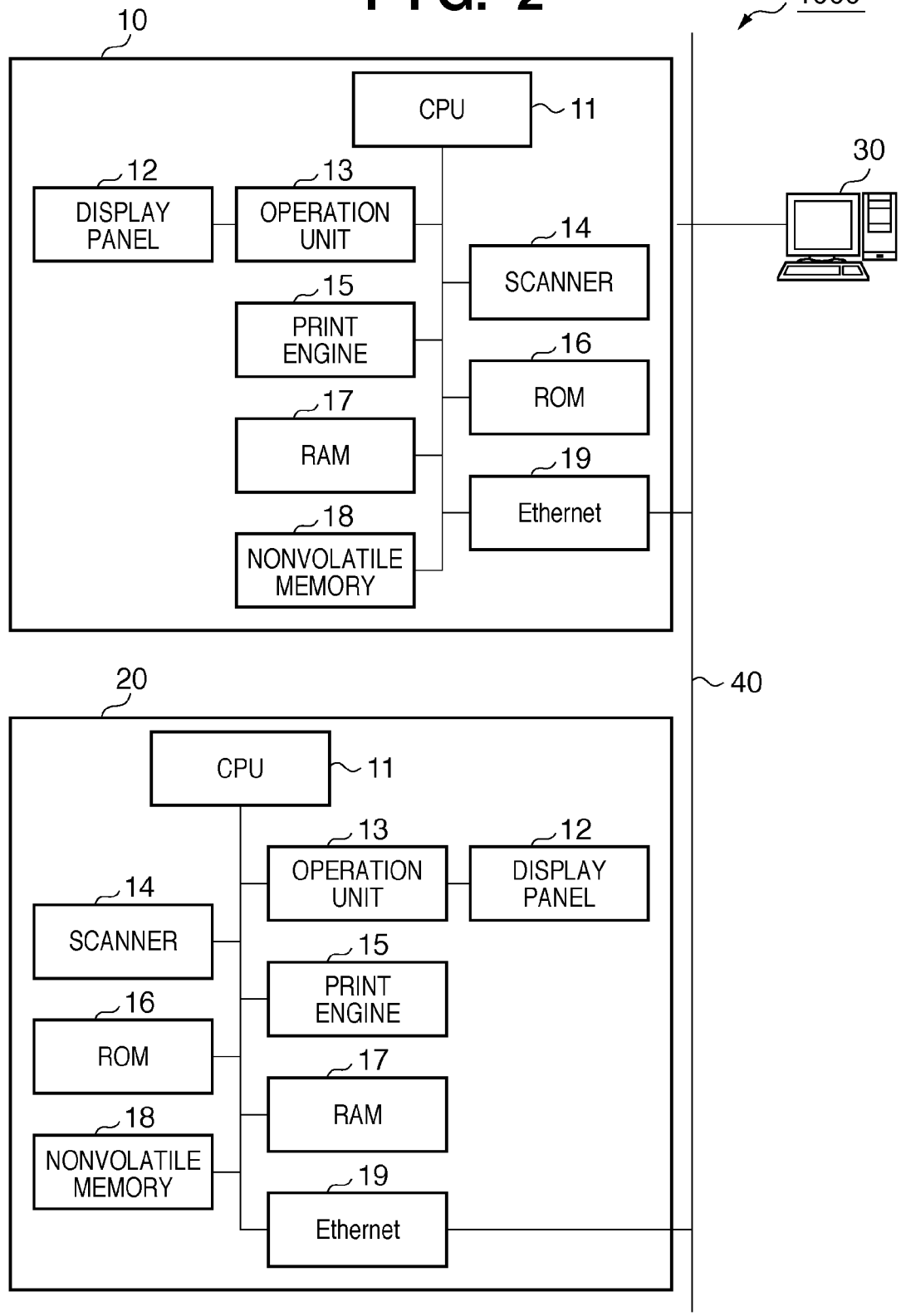
FIG. 2 is a block diagram showing a printing system 1000 according to the first embodiment.

The control arrangements of a printing system 1000, the multi function peripheral 10, and a multi function peripheral 20 according to the first embodiment will be explained with reference to FIG. 2. FIG. 2 is a block diagram showing the printing system 1000 according to the first embodiment.

The printing system 1000 includes the multi function peripherals 10 and 20, and a personal computer (to be referred to as a PC hereinafter) 30. These apparatuses are connected to each other via a LAN 40, and can communicate with each other. According to the first embodiment, in the printing system 1000, a plurality of printing apparatuses process print data in cooperation with each other. The printing system 1000 having the two multi-function peripherals 10 and 20 will be explained. However, the printing system 1000 is not limited to this configuration, and may also include a larger number of printing apparatuses and other job processing apparatuses.

The arrangement of the multi function peripheral 10 will be explained. The arrangement of the multi function peripheral 20 is the same as that of the multi function peripheral 10, and a description thereof will not be repeated. The multi function peripheral 10 includes a CPU 11, a display panel 12, an operation unit 13, a scanner 14, the print engine 15, a ROM 16, a RAM 17, a nonvolatile memory 18, and an Ethernet 19.

The CPU 11 controls the overall operation of the multi function peripheral 10. The display panel 12 displays information such as functions and settings to the operator. The operation unit 13 acquires, from the operator, inputs such as operation instructions to the scanner 14 and print engine 15, and execution instructions of various programs. The scanner 14 scans an image on an original, and converts it into image data representing the image. The print engine 15 prints an image on a sheet by using the components shown in FIG. 1.

The ROM 16 stores program codes for controlling the CPU 11, display panel 12, operation unit 13, scanner 14, and print engine 15. When the ROM 16 is formed from a rewritable flash ROM, program codes stored in the ROM can also be updated. The RAM 17 is used as a work memory for the control programs, and is also used to temporarily store image data scanned by the scanner 14 and image data to be printed by the print engine 15. The nonvolatile memory 18 stores image data and the like, and is formed from a hard disk (HDD), flash ROM, or the like. The Ethernet 19 is an Ethernet interface for connecting the multi function peripheral 10 to the LAN 40, and allows the multi function peripheral 10 to transmit/receive image data and the like to/from another apparatus.

Figure 3:
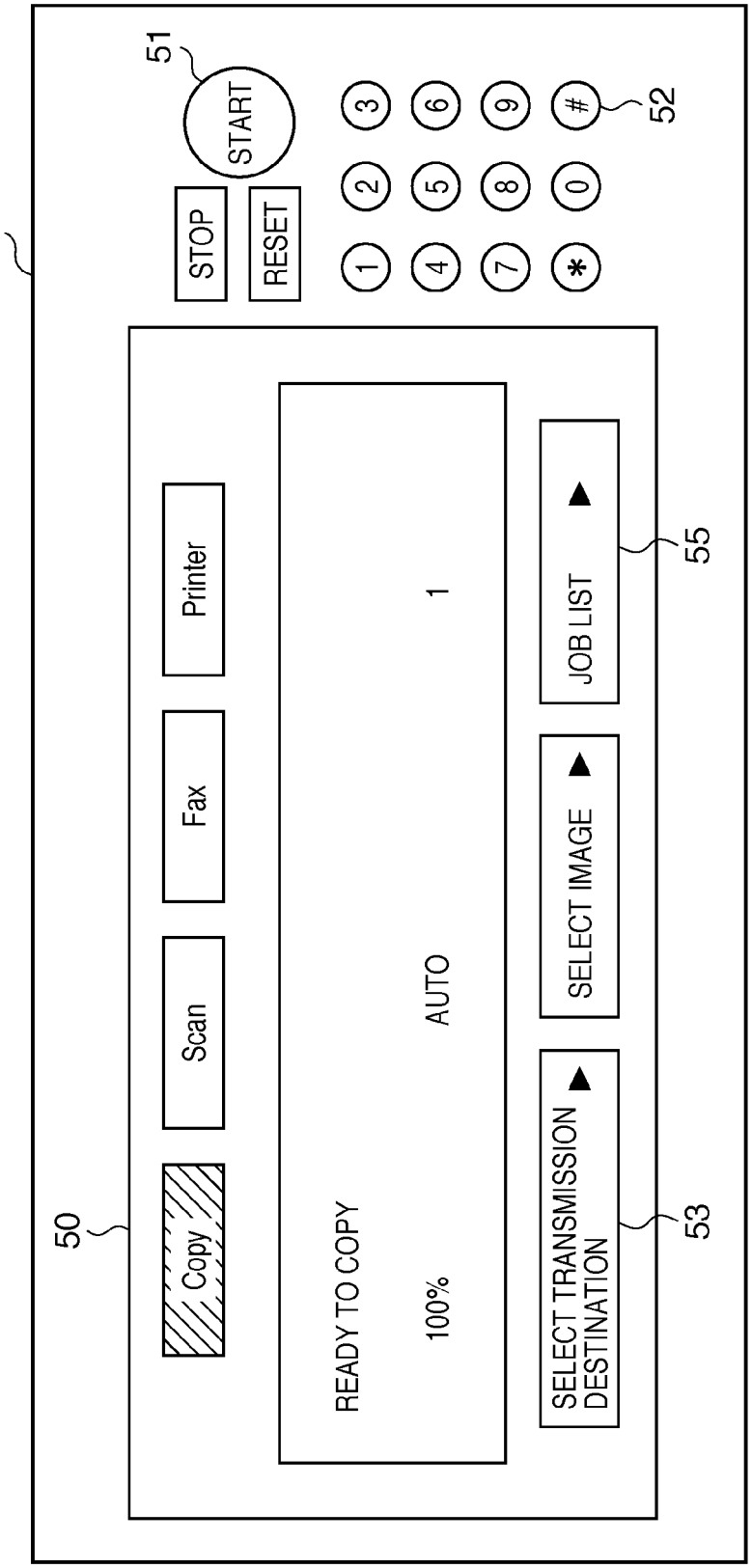
FIG. 3 is a view showing a display panel 12 and operation unit 13 when performing a copy operation.

Various functions of the multi function peripherals 10 and 20 will be explained using the display panel 12 and operation unit 13 shown in FIGS. 3 to 5 when executing functions. FIG. 3 is a view showing the display panel 12 and operation unit 13 when performing a copy operation. As shown in FIG. 3, the display panel 12 and operation unit 13 may also be integrated. In this case, the display panel 12 uses a liquid crystal touch panel 50, and is also available as the operation unit 13.

A start key 51 is a hard key, and a ten-key pad 52 is also a hard key. The liquid crystal touch panel 50 displays selectable soft keys 53 and 55, and the like. When the operator presses the start key 51 while the display panel 12 displays contents shown in FIG. 3 (copy mode is selected), the multi function peripheral 10 copies an original. More specifically, image data obtained by scanning an image on an original by the scanner 14 is supplied to the print engine 15 to print an image on a sheet.

Figure 4:
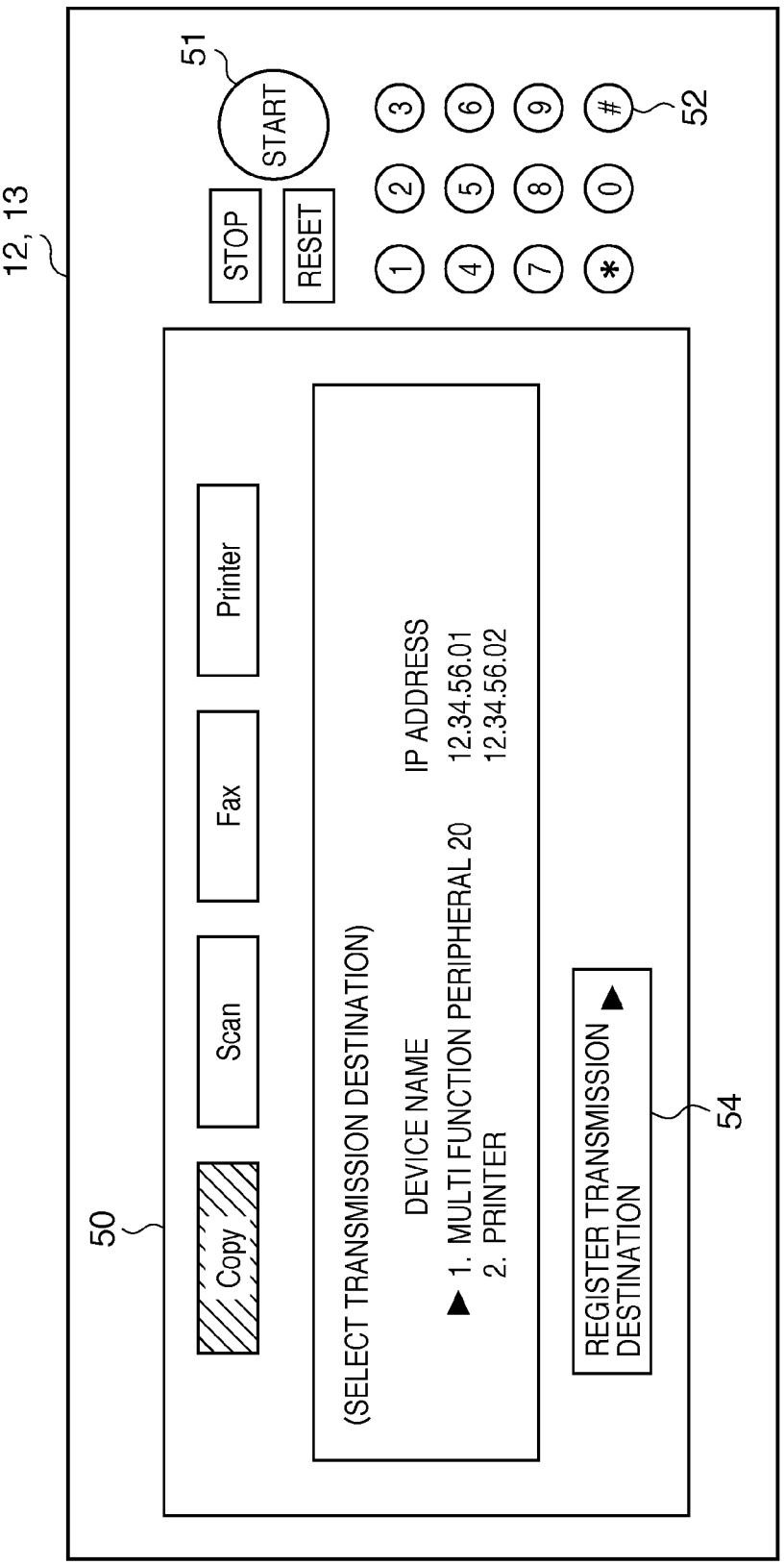
FIG. 4 is a view showing the display panel 12 and operation unit 13 when transmitting print data.

FIG. 4 is a view showing the display panel 12 and operation unit 13 when transmitting print data in order to perform remote copying or cascade copying. Remote copying is to cause the print engine of a given apparatus to print image data obtained by scanning an image on an original by the scanner of another apparatus connected via a network. Cascade copying is to cause the print engine of a given apparatus to print image data obtained by scanning an image on an original by the scanner of the given apparatus, and also cause the print engine of another apparatus connected via a network to print the image data. Remote copying and cascade copying cause a plurality of apparatuses to execute a print job (cooperation job) in cooperation with each other. Image data (print data) transmitted at this time corresponds to job data. The transmitted job data is not limited to image data from the scanner 14, but may also be data stored in advance in the nonvolatile memory 18 or the like. The contents of the display panel 12 shown in FIG. 4 are displayed upon pressing the soft key 53, that is, "select transmission destination" shown in FIG. 3. The liquid crystal touch panel 50 shown in FIG. 4 displays a soft key 54 for registering a destination (cooperative) printing apparatus. When the operator presses the soft key 54, the display panel 12 shows a display screen (not shown) for registering a destination printing apparatus.

The liquid crystal touch panel 50 shown in FIG. 4 displays designation printing apparatuses so as to be able to select one of them. The operator can select a printing apparatus with, for example, the ten-key pad 52. When the operator presses the start key 51 while selecting a destination printing apparatus, print data obtained by scanning an image on an original by the scanner 14 is transmitted to the selected printing apparatus (e.g., the multi function peripheral 20) via the LAN 40.

Figure 5:
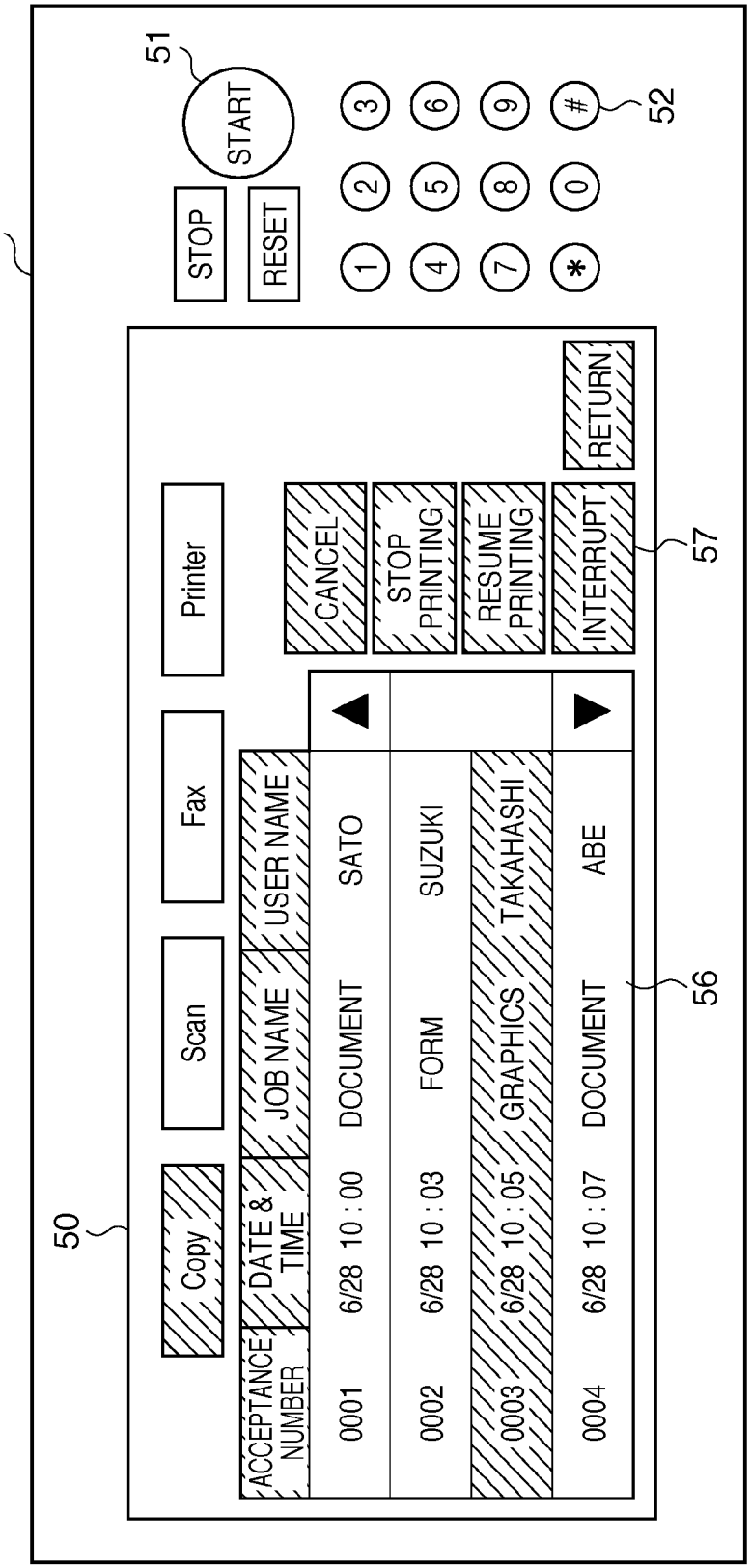
FIG. 5 is a view showing the display panel 12 and operation unit 13 when displaying a print job list.

FIG. 5 is a view showing the display panel 12 and operation unit 13 when displaying a list of jobs in process and on standby. A soft key 56 is a job list representing a list of job data during printing, transmission, and reception. From the list, the operator can select job data to be operated. The display screen shown in FIG. 5 appears upon pressing the soft key 55 shown in FIG. 3.

By pressing the soft key 56, the operator can select job data to be operated. By pressing a soft key 57 while selecting job data, the operator can designate execution of printing cancellation, printing stop, printing resume, or interrupt printing. Execution of printing cancellation, printing stop, printing resume, or interrupt printing upon pressing the soft key 57 will be called a job operation or job data operation.

<Print Data Transmission Control>

Figure 6:
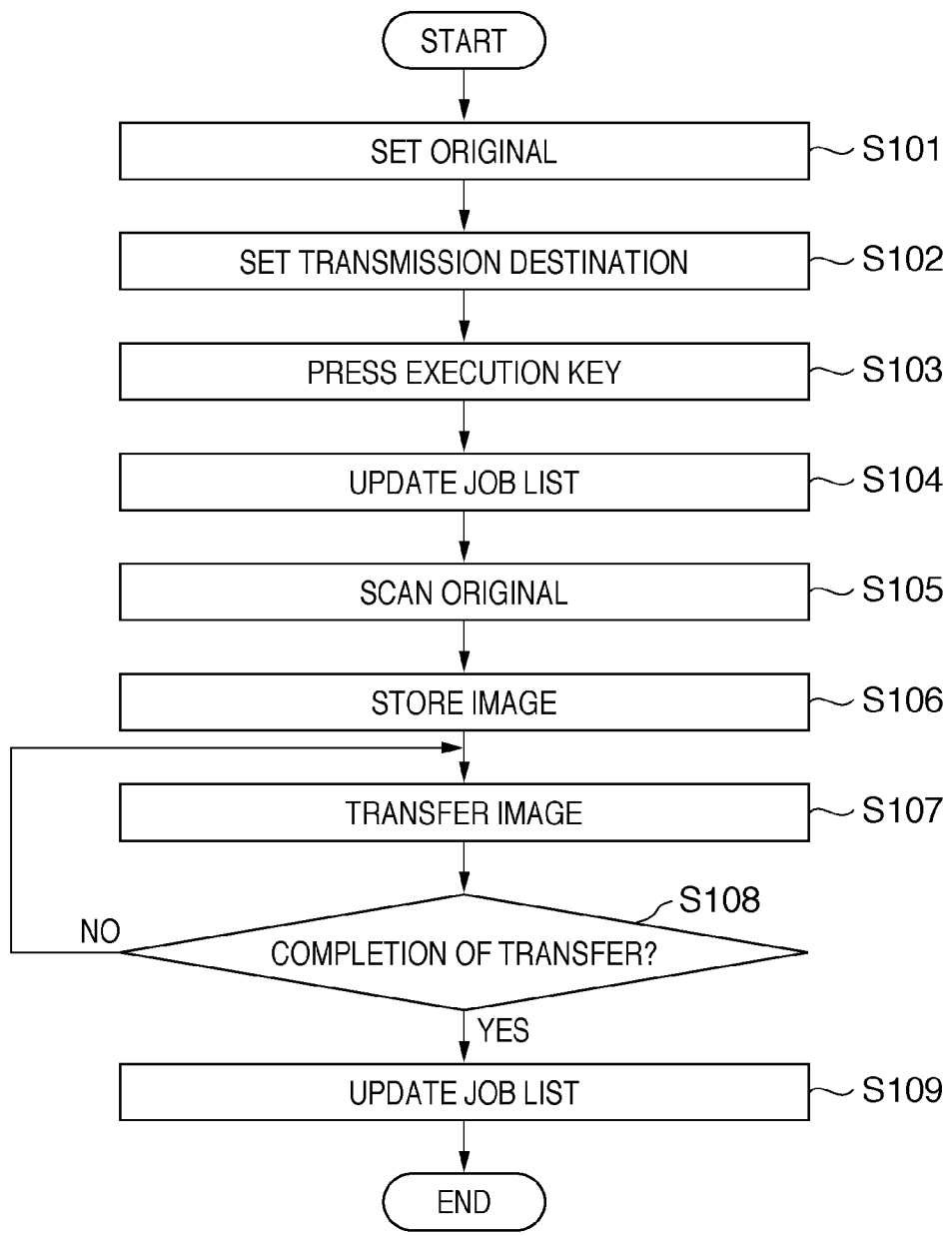
FIG. 6 is a flowchart showing control procedures to transmit scanned print data.

Control when the multi function peripheral 10 transmits print data (image data) associated with a cooperation job to the multi function peripheral 20 will be explained with reference to FIG. 6. FIG. 6 is a flowchart showing control procedures to transmit job data obtained by scanning an original by the scanner 14. The CPU 11 of the multi function peripheral 10 controls the entire following processing by loading, into the RAM 17, a program stored in the ROM 16 and executing the program.

In step S101, the CPU 11 recognizes that an original has been set on the scanner 14. When the operator selects remote copying or cascade copying, the CPU 11 displays the screen shown in FIG. 4 on the display panel 12 in step S102 in order to prompt him to select the transmission destination of the scanned image data. In step S103, the CPU 11 monitors the press of the start key 51.

If the CPU 11 confirms in S103 that the operator has pressed the start key 51, it updates job list information displayed on the display panel 12 in step S104 because a new job has been generated. In step S105, the CPU 11 causes the scanner 14 to scan an image on the original set on the scanner 14. In step S106, the CPU 11 converts the scanned data into image data, and stores the image data as print data in the RAM 17 or nonvolatile memory 18. Note that information in the job list can be displayed at least until the job is completed (printing is completed at the transmission destination) or stops.

Upon completion of storing the print data in S106, in step S107 the CPU 11 starts transferring print data to the destination printing apparatus (multi function peripheral 20) set in S102. At this time, the CPU 11 also transfers information representing that the current job is a cooperation job, a job ID for specifying the job, and the like. In step S108, the CPU 11 determines whether transfer of the print data is complete and printing by the receiving printing apparatus is also complete. More specifically, the CPU 11 receives an end notification including a job ID from the multi function peripheral 20 serving as the receiving printing apparatus, and then recognizes that printing by the multi function peripheral 20 is complete. Upon completion of printing by the multi function peripheral 20, the CPU 11 erases information of the job from the job list in step S109.

Figure 7:
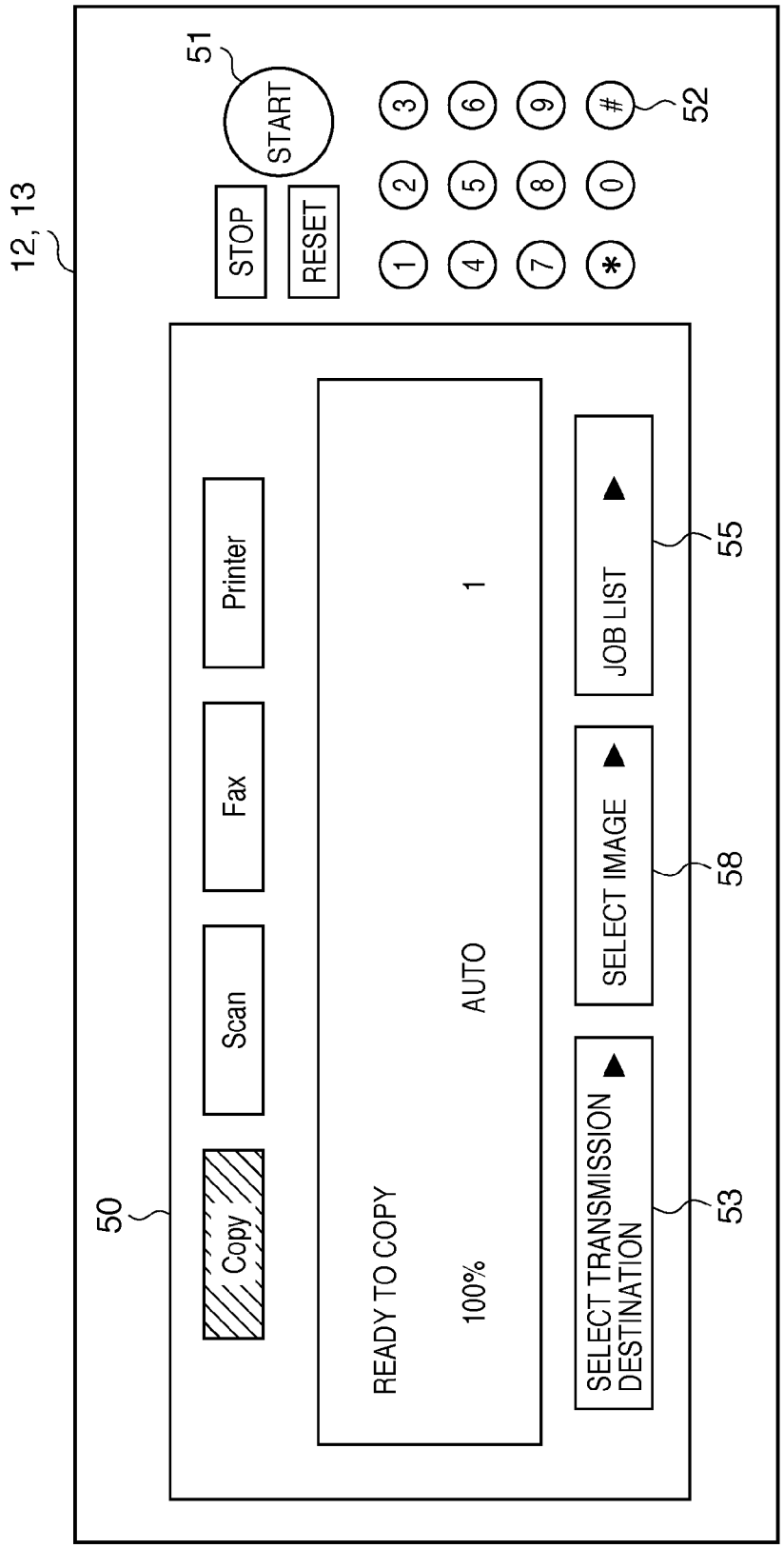
FIG. 7 is a view showing the display panel 12 and operation unit 13 when performing a copy operation.
Figure 8:
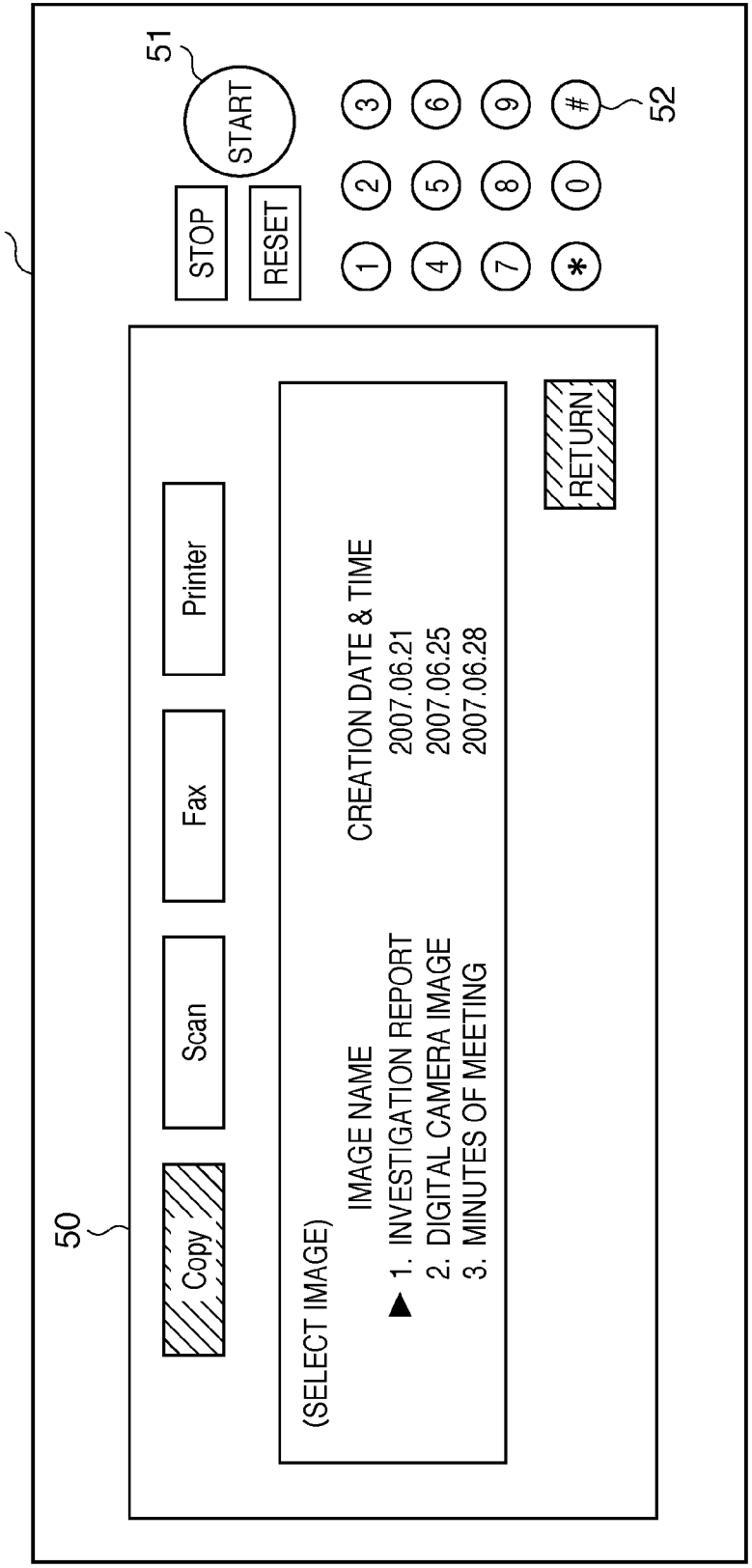
FIG. 8 is a view showing the display panel 12 and operation unit 13 when selecting an image.

The display panel 12 and operation unit 13 when selecting, as image data for a cooperation job, image data stored in the nonvolatile memory 18 instead of image data from the scanner 14 will be explained with reference to FIGS. 7 and 8. FIG. 7 is a view showing the display panel 12 and operation unit 13 when performing a copy operation. A soft key 58 shown in FIG. 7 is used to display, on the display panel 12, image data stored in the nonvolatile memory 18. When the operator presses the soft key 58, the display panel 12 displays an image shown in FIG. 8. FIG. 8 is a view showing the display panel 12 and operation unit 13 when selecting an image. As shown in FIG. 8, upon selecting the soft key 58, the CPU 11 displays, on the display panel 12, image data stored in, for example, the nonvolatile memory 18. These image data can be selected by pressing their image names on the liquid crystal touch panel 50.

Figure 9:
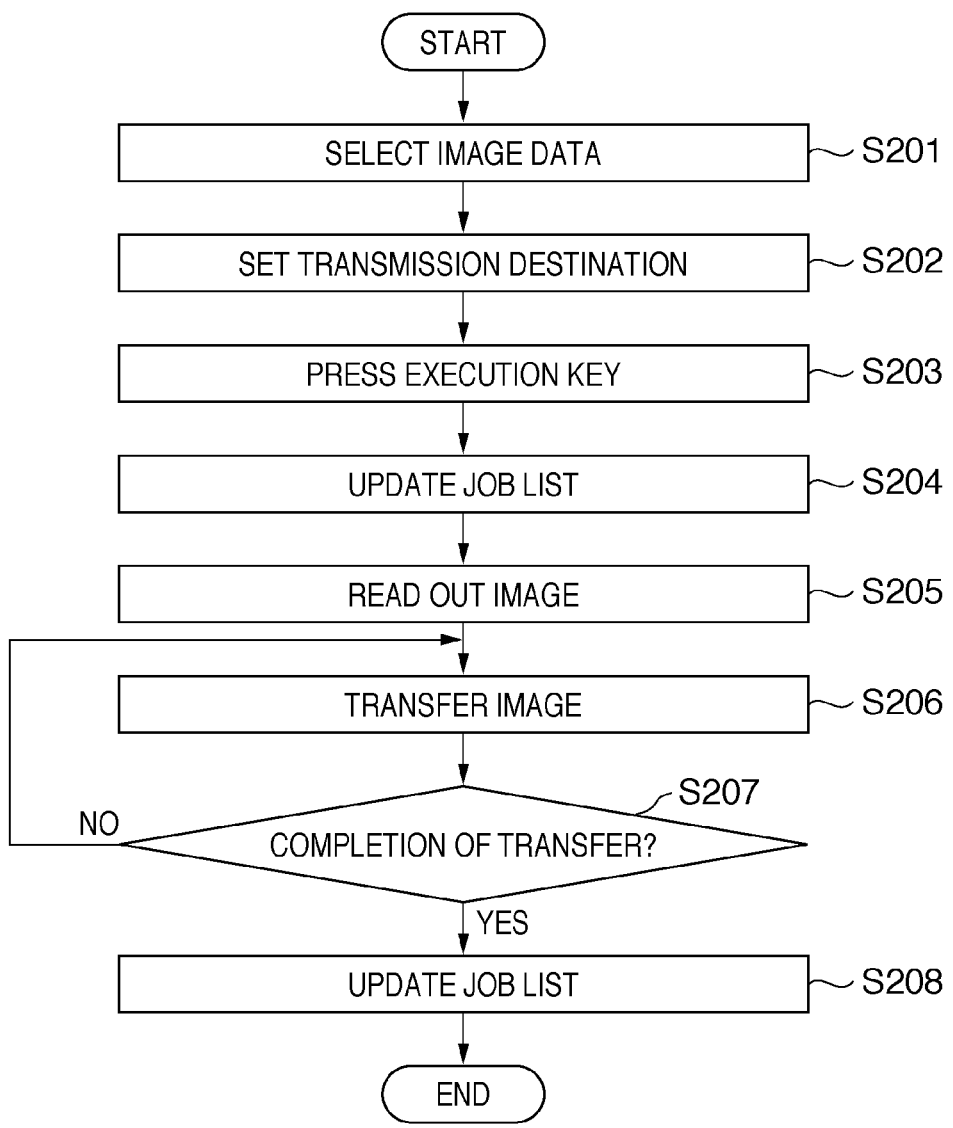
FIG. 9 is a flowchart showing control procedures to transmit stored image data as print data.

An operation sequence to transmit image data selected using the screen in FIG. 8 to a set destination printing apparatus (multi function peripheral 20) and print the image data will be explained with reference to FIG. 9. FIG. 9 is a flowchart showing control procedures to transmit stored image data as print data. The CPU 11 of the multi function peripheral 10 controls the entire following processing by loading, into the RAM 17, a program stored in the ROM 16 and executing the program.

When the operator selects the soft key 58 shown in FIG. 7 (remote copying or cascade copying of image data in the nonvolatile memory 18), the CPU 11 displays the display screen shown in FIG. 8 on the display panel 12 in step S201. The operator can select image data for use via the display screen. When the operator selects image data, the CPU 11 displays the screen shown in FIG. 4 on the display panel 12 in step S202 in order to prompt him to select the transmission destination of the selected image data. In step S203, the CPU 11 monitors the press of the start key 51.

If the CPU 11 confirms in S203 that the operator has pressed the start key 51, it updates job list information in step S204 because a new job has been generated. In step S205, the CPU 11 reads out the selected image data from the nonvolatile memory 18.

In step S206, after reading out the image data, the CPU 11 starts transferring print data to the destination printing apparatus set in S202. At this time, the CPU 11 also transfers information representing that the current job is a cooperation job, a job ID for specifying the job, and the like. In step S207, the CPU 11 determines whether transfer of the print data is complete and printing by the receiving printing apparatus is also complete. Upon completion of printing by the receiving printing apparatus, the CPU 11 erases information of the job from the job list in step S208.

<Print Data Reception Control>

Figure 10:
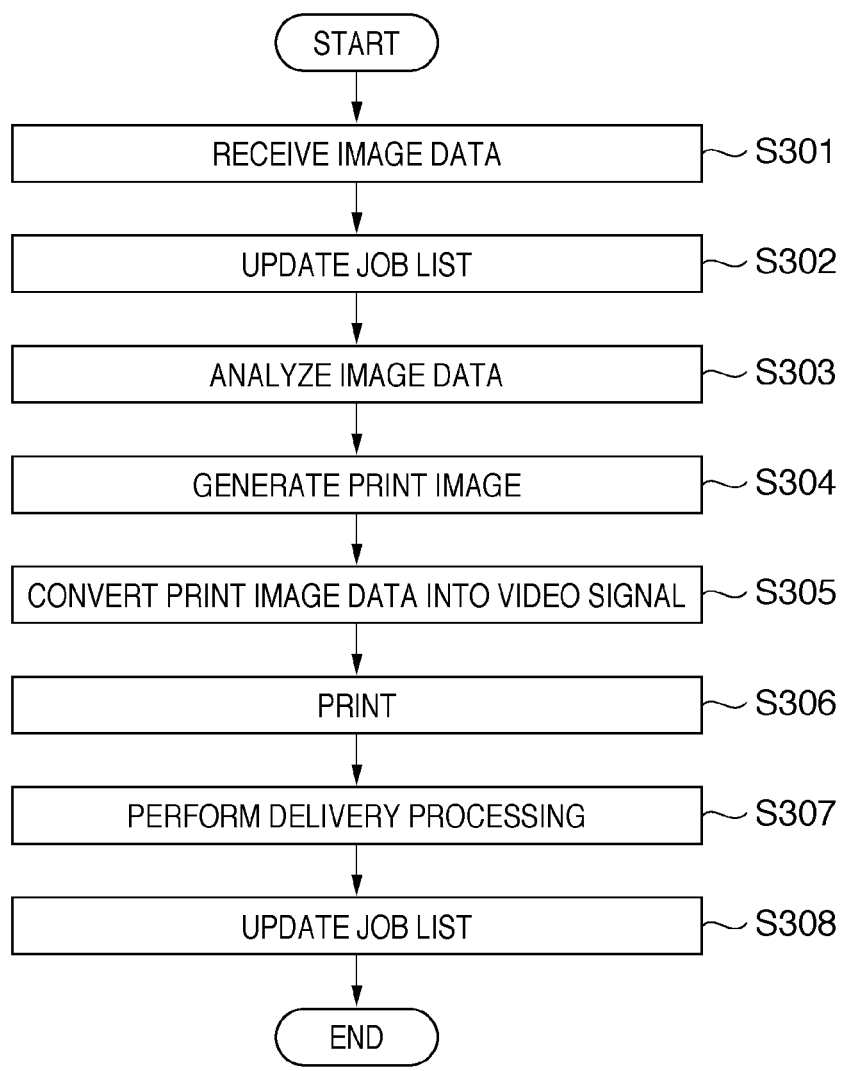
FIG. 10 is a flowchart showing control procedures to receive print data and print it.

An operation sequence to receive print data associated with a cooperation job transmitted from the multi function peripheral 10 and print it by the multi function peripheral 20 will be explained with reference to FIG. 10. FIG. 10 is a flowchart showing control procedures to receive print data and print it. The CPU 11 of the multi function peripheral 20 controls the entire following processing by loading, into the RAM 17, a program stored in the ROM 16 and executing the program.

In step S301, the CPU 11 receives print data from the multi function peripheral 10. In step S302, the CPU 11 updates job list information because a new job has been generated. At this time, the CPU 11 adds, to the job list, information based on a job ID received from the multi function peripheral 10.

In steps S303 and S304, the CPU 11 analyzes the received print data and generates a print image. In step S305, the CPU 11 converts data of the generated print image into a video signal. In step S306, the CPU 11 transmits the video signal to the print engine 15 to cause it to print. In step S307, the CPU 11 causes the print engine 15 to deliver a sheet bearing the image from the multi function peripheral 20. Upon completion of the delivery, the CPU 11 erases information of the job from the job list in step S308. At this time, the CPU 11 transmits, to the multi function peripheral 10 serving as the job data transmitting apparatus, an end notification representing that the job has ended, and the job ID of the job.

<Print Job Operation Authority Control>

Figure 11:
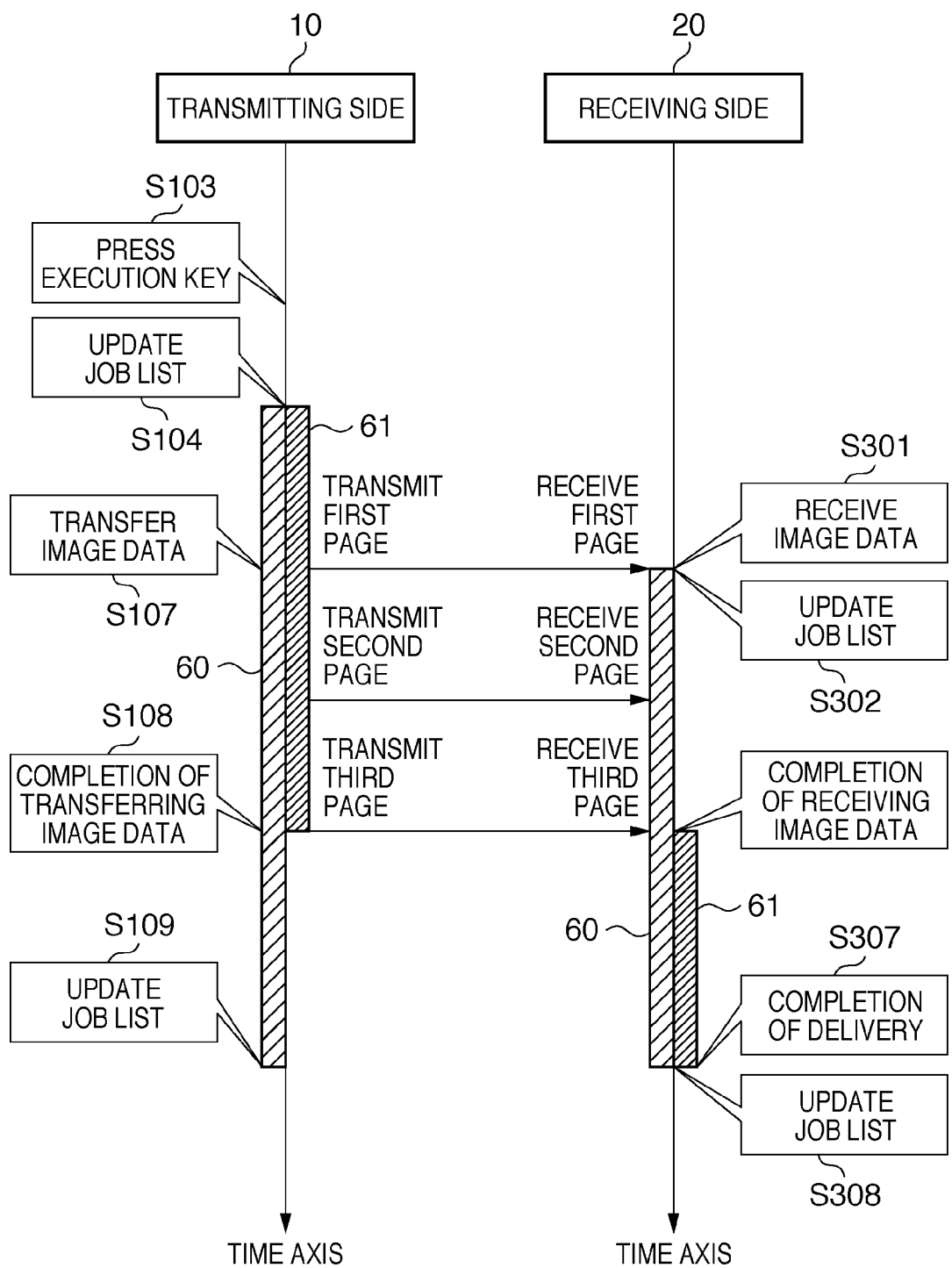
FIG. 11 is a sequence chart for explaining control of the operation authority according to the first embodiment.

Control of the print job operation authority will be explained with reference to FIGS. 11 to 16. FIG. 11 is a sequence chart for explaining control of the operation authority according to the first embodiment. Control of the print job operation authority when the multi function peripheral 20 receives and prints print data transmitted from the multi function peripheral 10 as job data associated with a cooperation job will be explained. FIG. 11 shows the relationship between the multi function peripheral 10 operating in accordance with the operation sequence shown in FIG. 6 and the multi function peripheral 20 operating in accordance with the operation sequence shown in FIG. 10. The time axis is defined from top to bottom. The multi function peripheral 10 transmits print data of three pages, and the multi function peripheral 20 prints three pages.

A job list display period 60 is a period during which each multi function peripheral displays a job list on the display panel 12. A print job operable period 61 is a period during which a print job can be operated using a list displayed in the job list. In other words, the print job operable period 61 represents which multi function peripheral has the print job operation authority.

As shown in FIG. 11, the multi function peripheral 10 on the print job transmitting side has the print job operation authority from step S104 to S108 in FIG. 6. More specifically, the multi function peripheral 10 has the print job operation authority to a target job until transmission of print data ends after generating a cooperation job in response to press of the start key 51 and adding information to the job list. While the multi function peripheral 10 has the operation authority, the CPU 11 of the multi function peripheral 20 prohibits the operator from operating print data. At this time, the CPU 11 of the multi function peripheral 20 which performs the prohibition processing functions as a prohibition unit. That is, each multi function peripheral prohibits the operation of a job for which the multi function peripheral does not have the operation authority. Exclusive shift of the job operation authority can suppress multiple operations by a plurality of multi function peripherals. The operation authority is a right capable of designating an operation such as cancellation, stop, or resume of a print job, interrupt printing, or the like.

To the contrary, the multi function peripheral 20 on the print job receiving side has the print job operation authority up to step S308 upon completion of receiving print data of the third page. More specifically, the multi function peripheral 20 has the print job operation authority until printing of print data is completed to update job list information upon completion of receiving the print data. While the multi function peripheral 20 has the operation authority, the CPU 11 of the multi function peripheral 10 prohibits the operator from operating print data. The CPU 11 of the multi function peripheral 10 which performs the prohibition processing functions as a prohibition unit.

The job list display period 60 of the multi function peripheral 10 starts when information on a target job is added to the job list in S104, and ends when the information is deleted in S109. That is, the job list display period 60 of the multi function peripheral 10 starts when print data is stored in the nonvolatile memory 18, and ends when printing by a destination printing apparatus is complete. During the period during which the display of the target job in the job list is valid in the multi function peripheral 10, a period until transmission of all job data is completed is a job operable period in the multi function peripheral 10. The remaining period is a job operable period in the multi function peripheral 20.

The job list display period 60 of the multi function peripheral 20 starts when the target job is added to the job list in S302, and ends when it is deleted in S308. That is, the job list display period 60 of the multi function peripheral 20 starts when reception of the print data starts, and ends when printing of the received print data is complete. During the period during which the display of the target job in the job list is valid in the multi function peripheral 20, a period until printing of all job data is completed after receiving them is a job operable period in the multi function peripheral 20. The remaining period is a job operable period in the multi function peripheral 10.

In this manner, according to the first embodiment, any one of printing apparatuses included in the printing system 1000 has the print job operation authority until a print job is completed after generating it. That is, only one of printing apparatuses which process one cooperation job has the job operation authority during a given period, and the remaining printing apparatuses prohibit the operation of the job. The printing apparatuses are controlled to exclusively shift the operation authority between the printing apparatuses which process one cooperation job. This suppresses multiple operations while assuring a cooperative printing operation. As shown in FIG. 11, even while each apparatus does not have the operation authority, a target print job is displayed in the job list as long as it exists. The operator can confirm the processing status of the print job from any apparatus.

Figure 12:
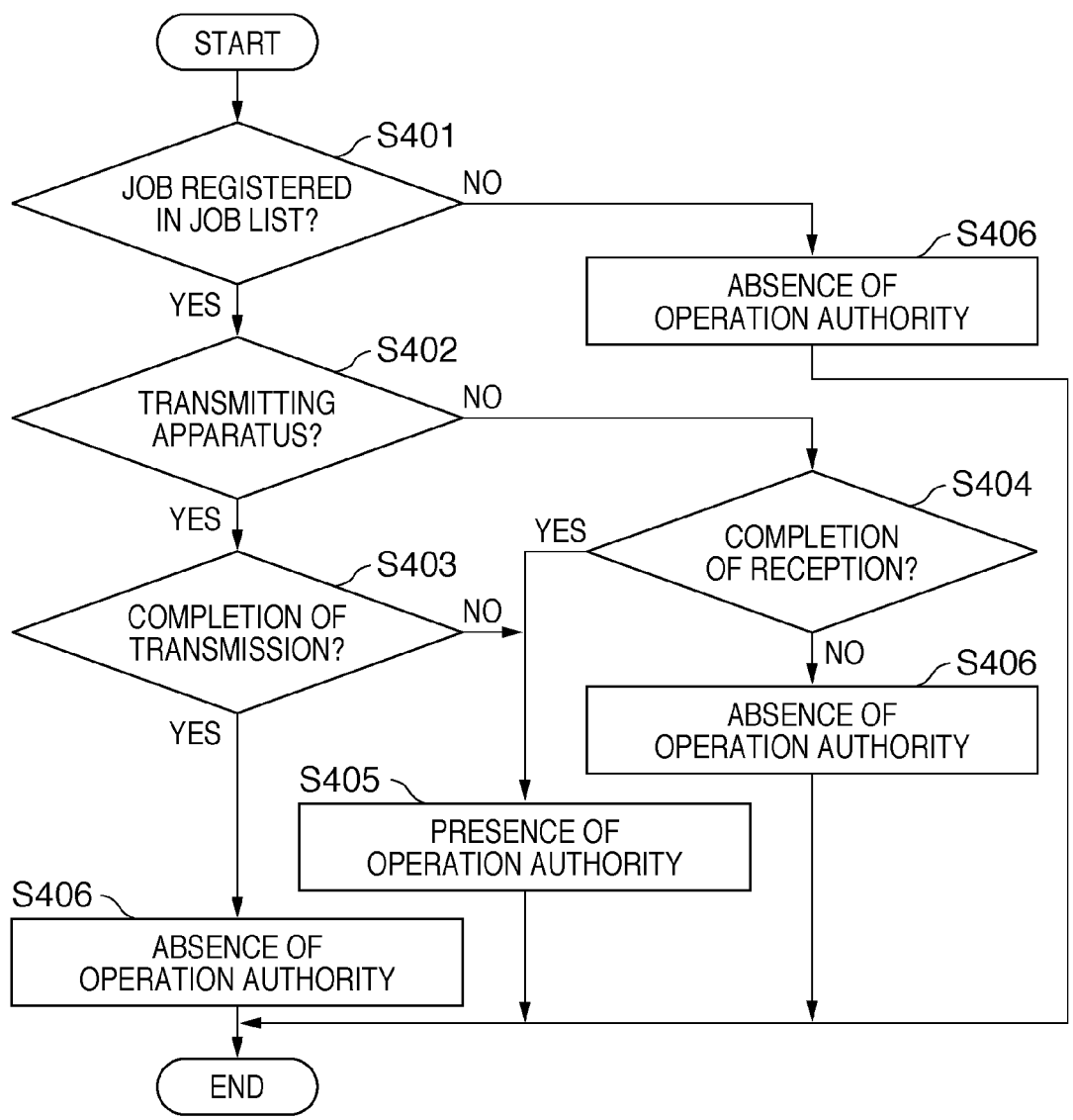
FIG. 12 is a flowchart showing control procedures to determine the presence or absence of the operation authority according to the first embodiment.

A determination method of determining whether the printing apparatus has the operation authority will be explained with reference to FIG. 12. FIG. 12 is a flowchart showing control procedures to determine the presence or absence of the operation authority according to the first embodiment. The CPU 11 controls the entire following processing by loading, into the RAM 17, a program stored in the ROM 16 and executing the program. In this case, the CPU 11 functions as an analysis unit and determination unit, and the same processing is done in transmitting and receiving multi function peripherals.

In step S401, the CPU 11 determines whether a print job to be operated is registered in the job list. This processing is executed when a predetermined operation is done via the operation unit 13. If no print job is registered in the job list, the CPU 11 determines in step S406 that the printing apparatus does not have the right to operate the print job.

When the print job is registered in the job list, the CPU 11 determines in step S402 whether the printing apparatus serves as an apparatus for transmitting print data of the print job. If the CPU 11 determines that the printing apparatus is the transmitting apparatus, it determines in step S403 whether transmission of the print data is complete. If transmission of the print data is complete, the CPU 11 determines in step S406 that the printing apparatus does not have the right to operate the print job. If transmission of the print data is not complete, the CPU 11 determines in step S405 that the printing apparatus has the right to operate the job.

If the CPU 11 determines in S402 that the printing apparatus is not the transmitting apparatus, it determines that the printing apparatus serves as an apparatus for receiving print data of the print job, and shifts the process to S404. In step S404, the CPU 11 determines whether reception of the print data is complete. If reception of the print data is complete, the CPU 11 determines in step S405 that the printing apparatus has the right to operate the print job. If reception of the print data is not complete, the CPU 11 determines in step S406 that the printing apparatus does not have the right to operate the print job.

As described above, the printing apparatus according to the first embodiment analyzes the processing status of predetermined print data, and determines, based on the analysis result, whether the printing apparatus has the right to operate a print job including the print data. If it is determined in S405 described above that the printing apparatus has the operation authority, the operation authority continues until the print job is deleted from the job list, as shown in FIG. 11. The determined operation authority may also be displayed on the display panel 12 to notify the operator of it. Examples of the display will be explained with reference to FIGS. 13 and 14.

Figure 13:
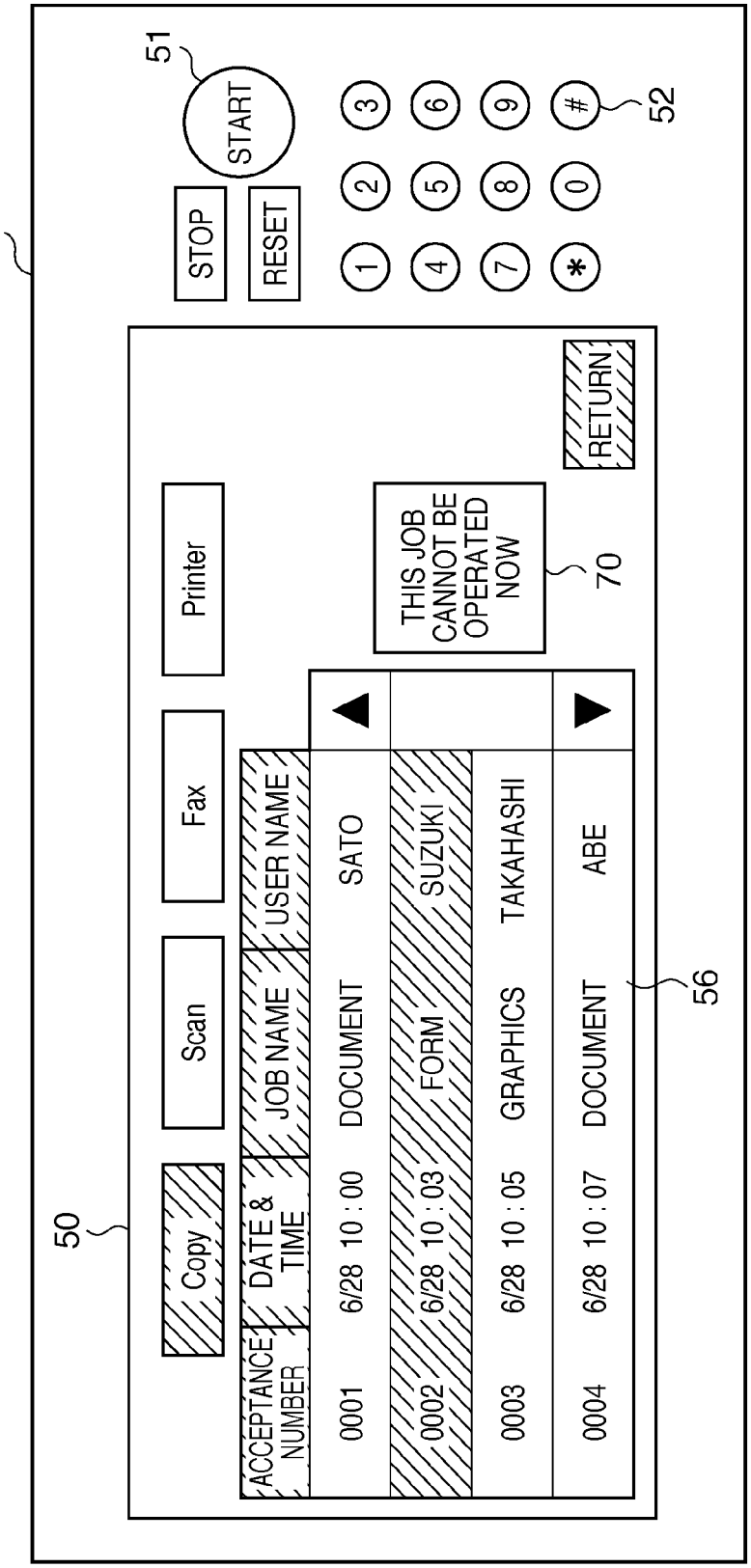
FIG. 13 is a view showing a display example of the display panel 12 and operation unit 13 upon selecting a print job.
Figure 14:
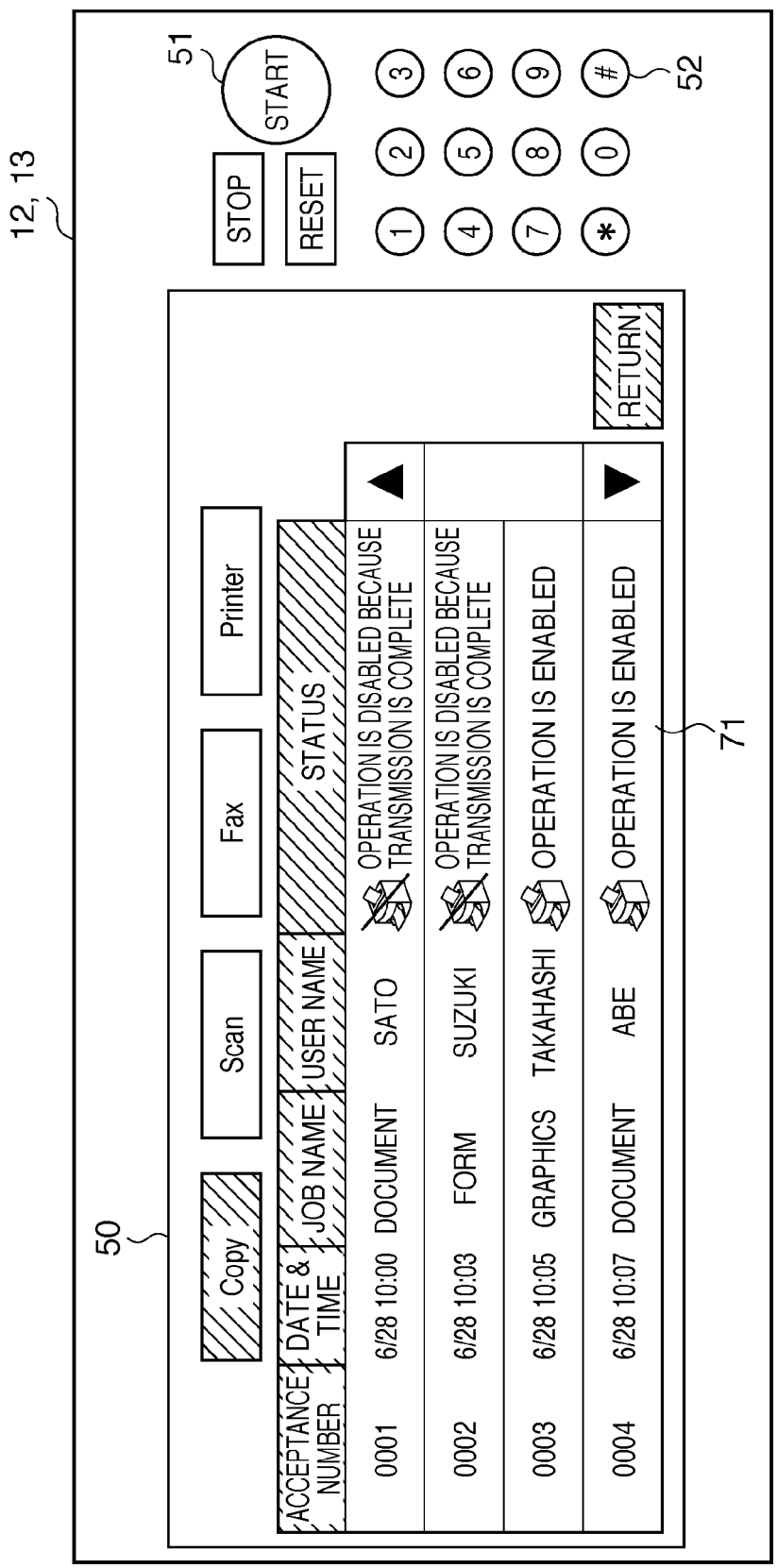
FIG. 14 is a view showing a display example of the display panel 12 and operation unit 13 upon selecting a print job.

FIGS. 13 and 14 are views showing display examples of the display panel 12 and operation unit 13 upon selecting a print job. In FIG. 13, reference numeral 70 represents that the operator does not have the right to operate a print job when the print job is selected. When the operator does not have the operation authority, the CPU 11 controls not to display the soft key 57 shown in FIG. 5, that is, a soft key for printing cancellation, printing stop, printing resume, and interrupt printing even if print data to be operated is selected.

FIG. 14 shows an example of displaying an operation enable/disable status 71 of each job in the job list upon pressing the soft key 55 shown in FIG. 3 to display the job list. As shown in FIG. 14, the operation enable/disable status 71 is expressed by, for example, an icon and character string. When the operator selects an operable job, the soft key 57 shown in FIG. 5 for printing cancellation, printing stop, printing resume, and interrupt printing is displayed. The icon is a small symbolic picture sign representing a function, processing contents, or the like. By displaying the operation authority as an icon, the operation authority can be intuitively expressed to simplify the screen display. The operation authority is expressed using an icon in this example, but may also be expressed using only a character string, only an icon, or another form.

<Modification>

In the above description, the present invention is applied to the printing system 1000 having two multi function peripherals. However, the present invention is not limited to two printing apparatuses, and may also be applied to a printing system having three or more printing apparatuses. Control of the operation authority in a printing system having three multi function peripherals will be described with reference to FIGS. 15 and 16.

In this case, the multi function peripheral 10 transmits print data (image data) of three pages to the multi function peripheral 20, and the multi function peripheral 20 prints the images of three pages. Further, the multi function peripheral 20 transfers the print data received from the multi function peripheral 10 to a multi function peripheral 21, and even the multi function peripheral 21 prints the images of three pages.

Figure 15:
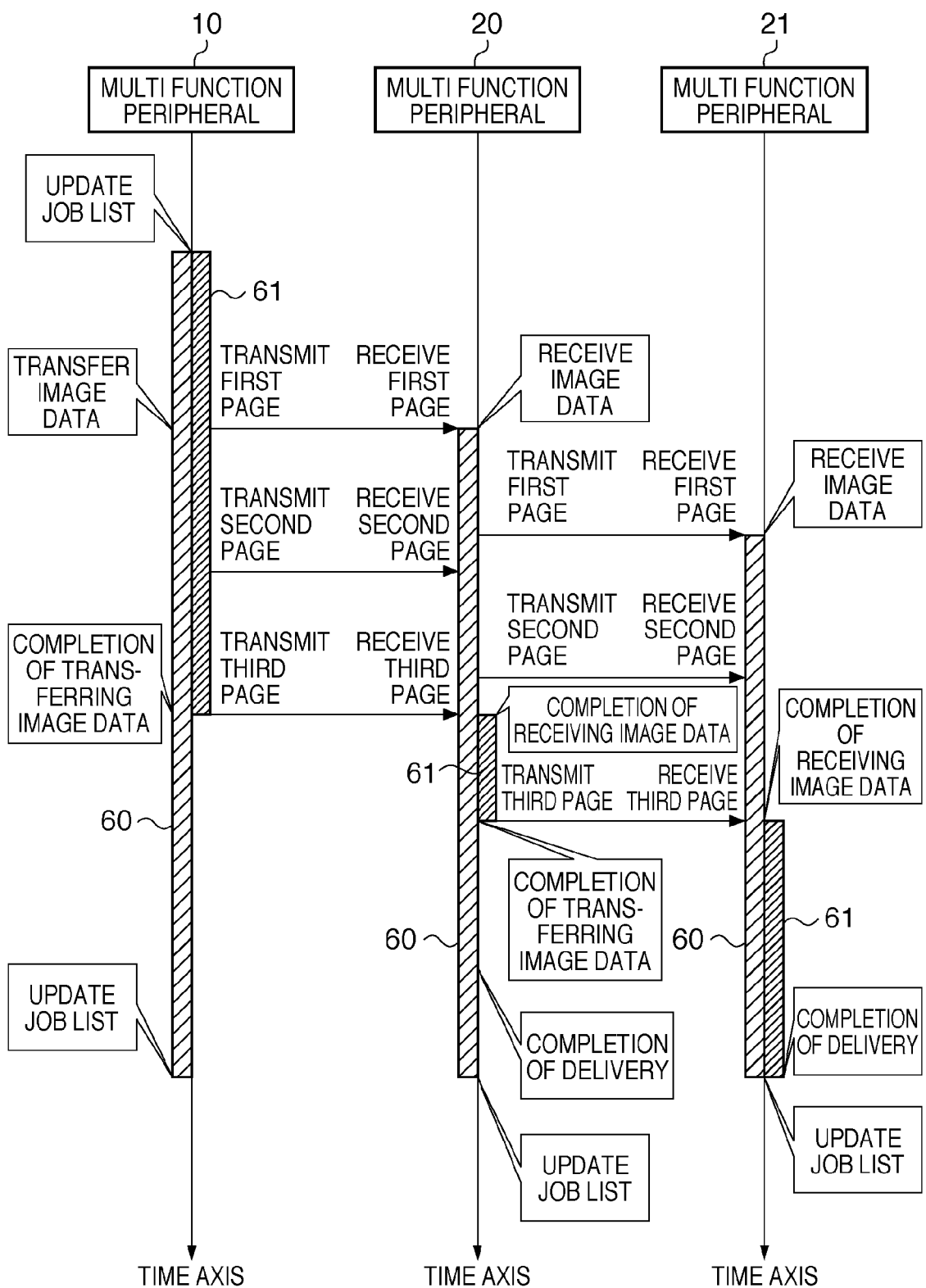
FIG. 15 is a sequence chart for explaining control of the operation authority according to the first embodiment.

FIG. 15 is a sequence chart for explaining control of the operation authority according to the first embodiment. A description of the same processes as those in FIG. 11 will not be repeated. As shown in FIG. 15, the print job operable period 61 of the multi function peripheral 10 is the same as that in FIG. 11. The job list display period 60 of the multi function peripheral 10 starts when a print job is added to the job list, and ends when printing by the multi function peripherals 20 and 21 is complete and the print job is deleted from the job list.

The multi function peripheral 20 transmits print job to the multi function peripheral 21 parallel to reception of print data. Hence, the job list display period 60 of the multi function peripheral 20 continues until printing by the multi function peripherals 20 and 21 is completed. The print job operable period 61 of the multi function peripheral 20 starts when reception of print data from the multi function peripheral 10 is complete, and ends when transmission of print data to the multi function peripheral 21 is complete.

The job list display period 60 of the multi function peripheral 21 starts when reception of print data from the multi function peripheral 20 is complete, and ends when printing is complete (delivery is complete) and the print job is deleted from the job list. The print job operable period 61 of the multi function peripheral 21 starts when reception of print data from the multi function peripheral 20 is complete, and ends when printing is complete and the print job is deleted from the job list.

Figure 16:
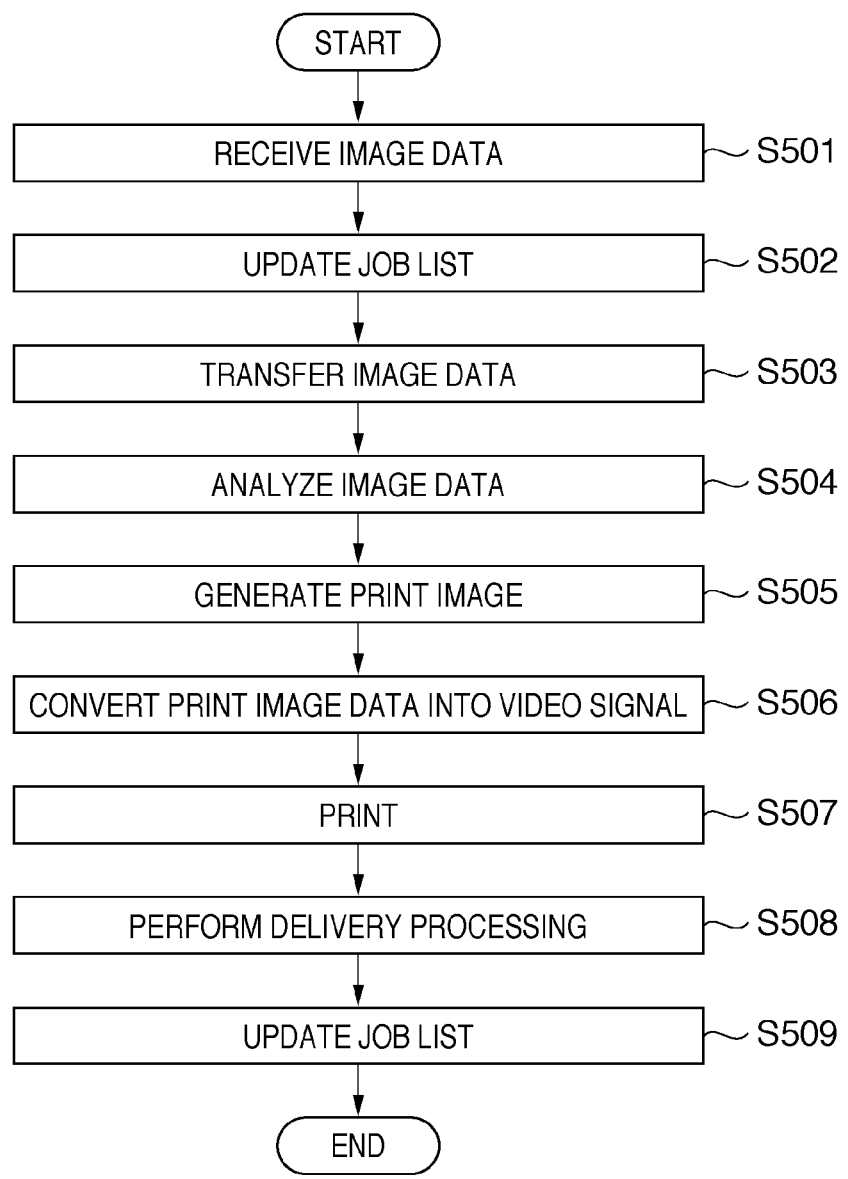
FIG. 16 is a flowchart showing the control procedures of a multi function peripheral 20 shown in FIG. 15.

The operation sequence of the multi function peripheral 20 will be explained with reference to FIG. 16. FIG. 16 is a flowchart showing the control procedures of the multi function peripheral 20 shown in FIG. 15. The CPU 11 of the multi function peripheral 20 controls the entire following processing by loading, into the RAM 17, a program stored in the ROM 16 and executing the program.

In step S501, the CPU 11 receives print data from the multi function peripheral 10. In step S502, the CPU 11 adds the print data to the job list.

In step S503, the CPU 11 transmits the received print data to the multi function peripheral 21. Before receiving all print data of three pages from the multi function peripheral 10, the CPU 11 may also start transmitting print data to the multi function peripheral 21. In this case, for example, upon completion of receiving print data of the first page, the CPU 11 may also start transmitting the page. A destination printing apparatus in S503 is desirably designated in advance, similar to step S102 in FIG. 5. For example, in the case shown in FIG. 15, when selecting transmission destinations in the multi function peripheral 10, the two multi function peripherals 20 and 21 are designated.

In step S504, the CPU 11 analyzes the received print data (image data). In step S505, the CPU 11 generates a print image from the print data. In step S506, the CPU 11 converts image data of the generated print image into a video signal.

In step S507, the CPU 11 transfers the video signal obtained in S506 to the print engine 15 to cause it to print. After the image is printed on a sheet, in step S508, the CPU 11 causes the print engine 15 to deliver the printed sheet from the multi function peripheral 20. Upon completion of the delivery, the CPU 11 deletes the job from the job list in step S509, and ends the processing.

In the above-described modification, print processing in S504 to S508 is executed after transmitting print data in S503. However, transmission processing and print processing of print data may also be parallel-executed. The multi function peripheral 20 directly transfers, to the multi function peripheral 21, print data received from the multi function peripheral 10. However, the multi function peripheral 20 may also process image data in it, and then transmit the processed data to the multi function peripheral 21.

As described above, when the printing apparatus according to the first embodiment processes print data in cooperation with another printing apparatus, it determines that it has the right to operate print data only when a printing apparatus which has received print data is printing the print data or when reception of the print data is complete but transmission of it is not complete. More specifically, the printing apparatus analyzes the processing status of predetermined print data, and determines, in accordance with the analyzed processing status, whether the printing apparatus has the operation authority. If it is determined that the printing apparatus does not have the operation authority, even if the operator operates the print data, processing corresponding to the operation is prohibited.

This can suppress multiple operations from a plurality of printing apparatus to one print data.

Figure 17:
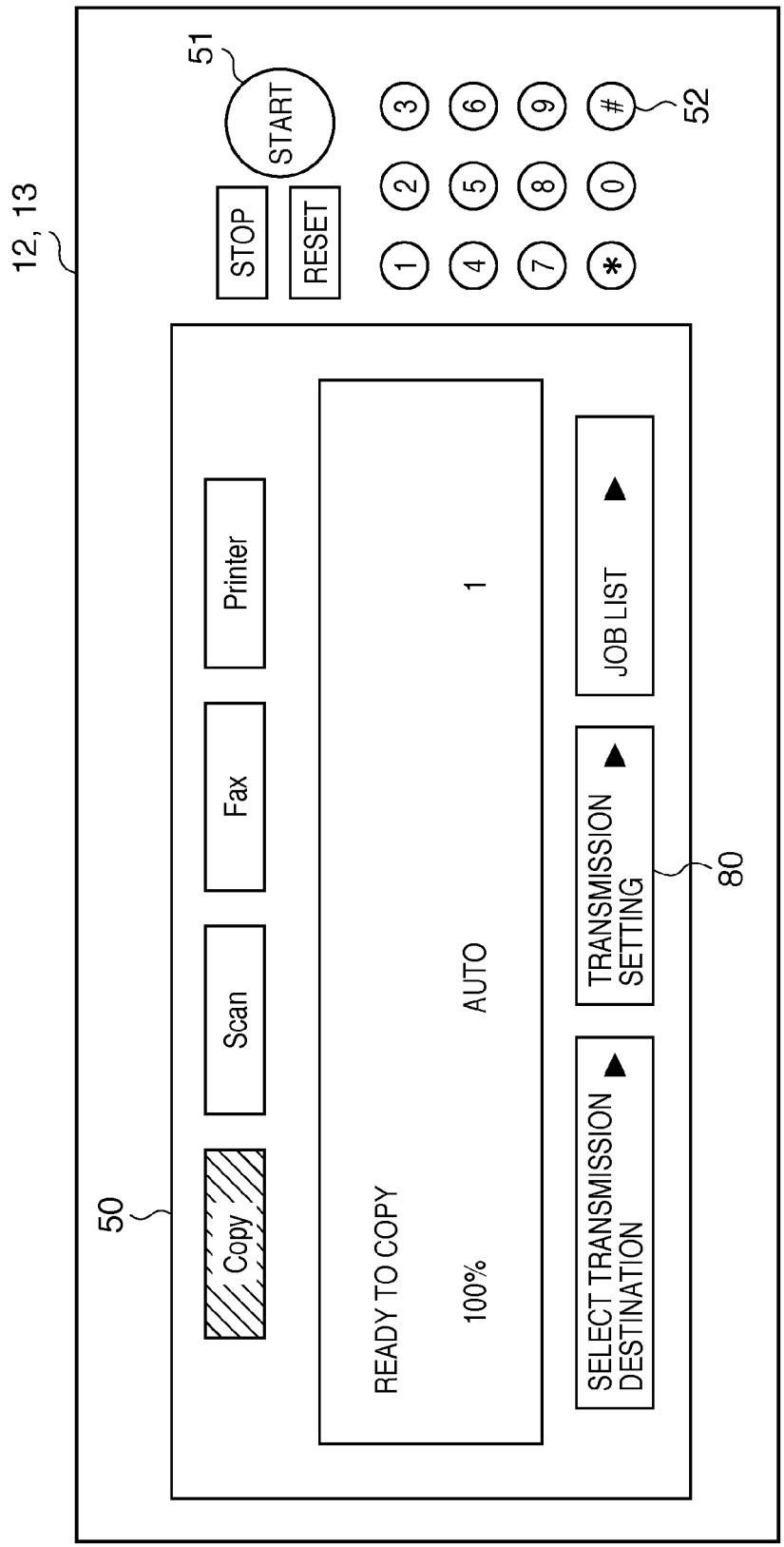
FIG. 17 is a view showing a display panel 12 and operation unit 13 when setting the operation authority according to the second embodiment.
Figure 18:
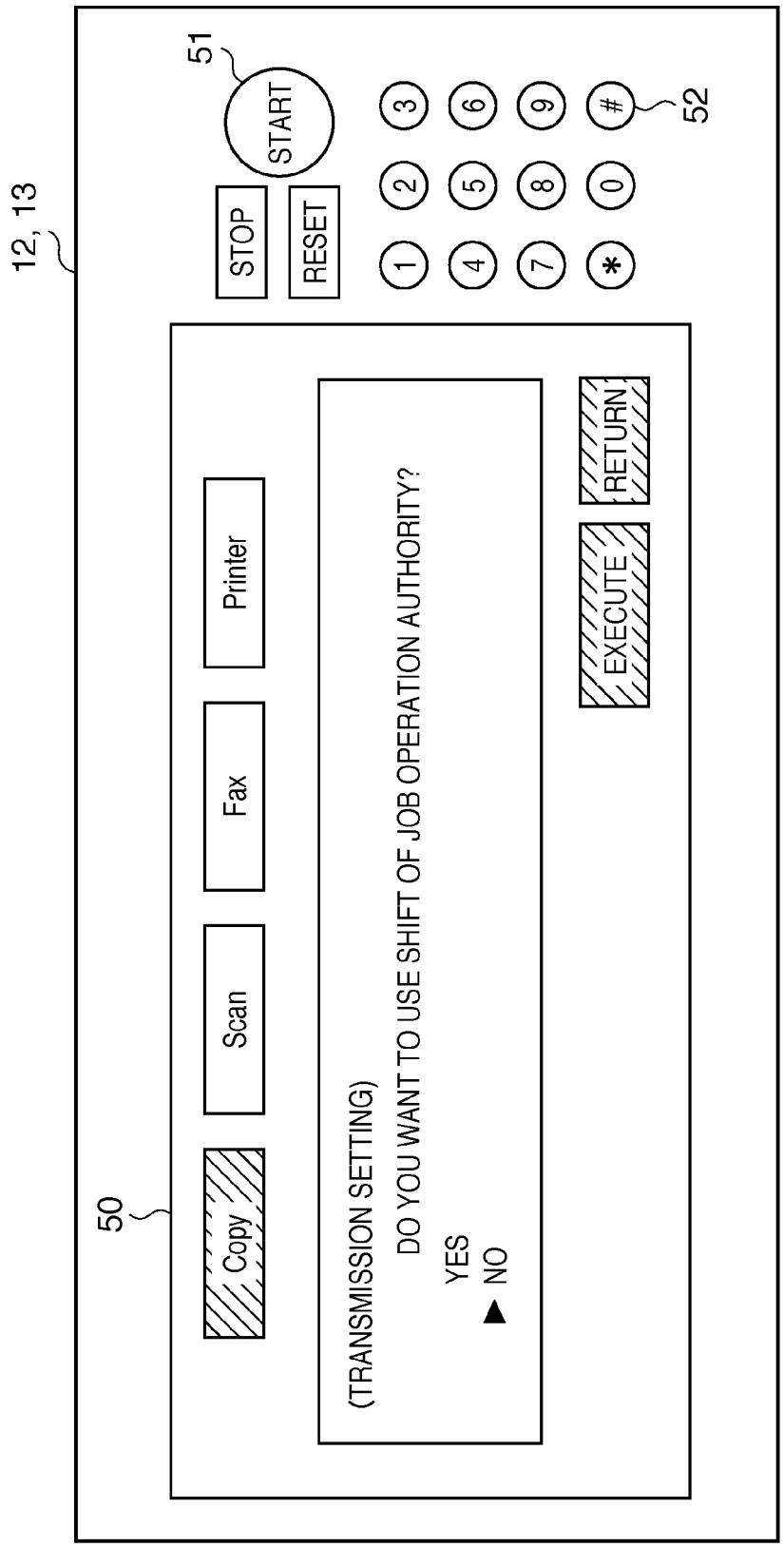
FIG. 18 is a view showing the display panel 12 and operation unit 13 when setting the operation authority according to the second embodiment.
Figure 19:
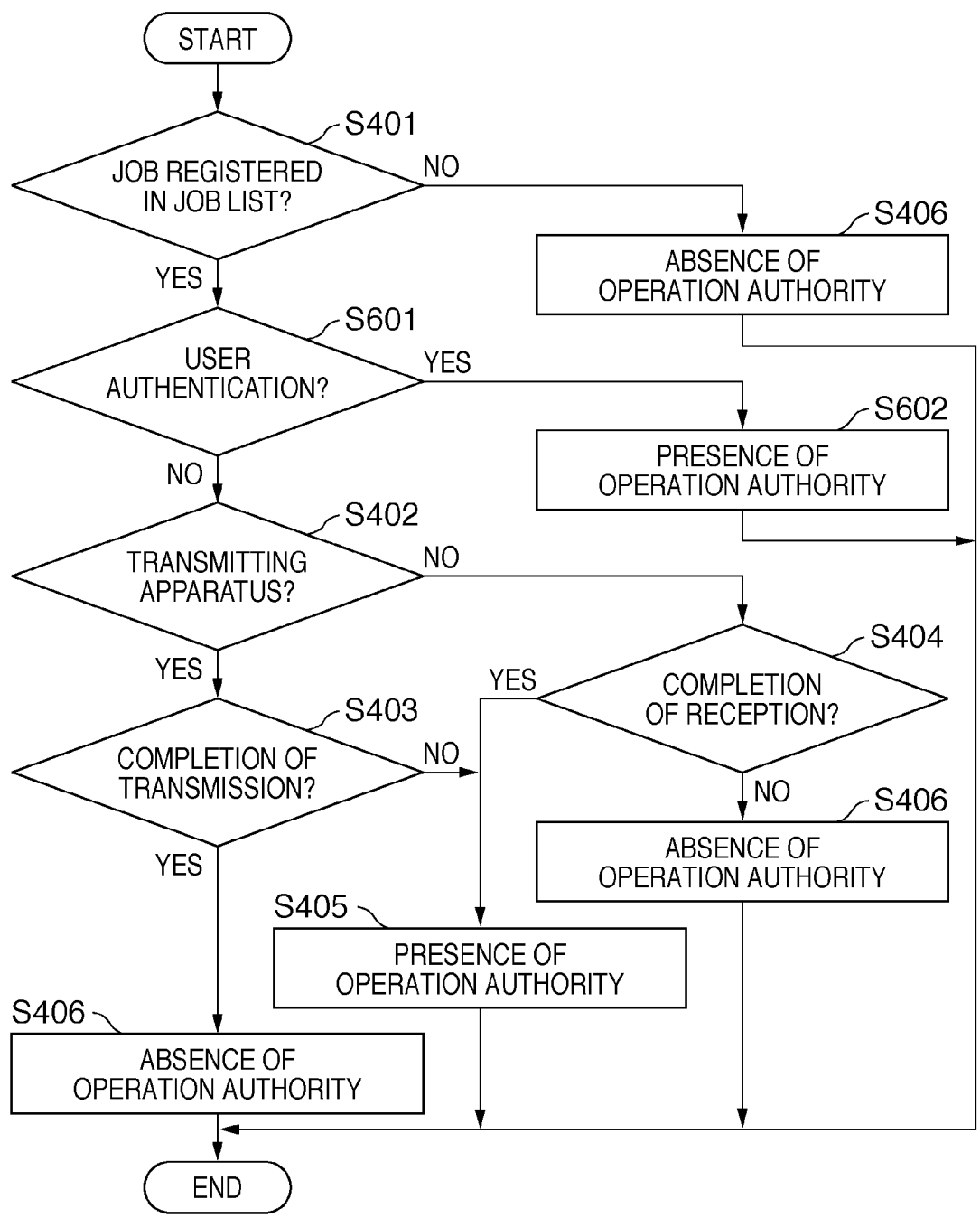
FIG. 19 is a flowchart showing control procedures to determine the presence or absence of the operation authority according to the second embodiment.

A second embodiment will be explained with reference to FIGS. 17 to 19. A feature of the second embodiment is that the operation authority is switched in accordance with an input from the operator. An example of setting the operation authority will be explained with reference to FIGS. 17 and 18. FIGS. 17 and 18 are views showing a display panel 12 and operation unit 13 when setting the operation authority according to the second embodiment.

When the operator presses a soft key 80 for making a transmission setting shown in FIG. 17, a CPU 11 displays a screen shown in FIG. 18 to set the print job operation authority. As shown in FIG. 18, the display panel 12 displays a change screen for prompting the operator to select whether to shift the print job operation authority (job operation authority). Shift of the job operation authority means giving the operation authority to a printing apparatus when it is determined in the first embodiment that the printing apparatus does not have the operation authority. That is, the printing apparatus can change from a state in which it does not have the operation authority to one in which it has the operation authority. If all users are permitted to shift the operation authority, this may cause multiple operations. Thus, user authentication is desirably performed before giving the operation authority.

User authentication requires a user name and password to be input when executing printing or operating a printing apparatus. If the user name and password do not coincide with those input in advance, the user cannot use the printing apparatus. By prompting a user to input a user name and password, users of the printing apparatus can be limited, and a log of printing contents by each user can also be left. User authentication can adopt a variety of methods such as a method using an ID card which records information for specifying a user.

When user authentication is employed in printing, only an authenticated user can operate print data, and it is assumed that another person may not perform a job operation. It is not necessary to control the operation authority and prevent an operation error. Thus, only when no user authentication is executed, the above-described operation authority shift control is done in accordance with the job status. When user authentication is executed, no operation authority shift control is performed, and the user can operate a print job regardless of the print data processing status.

The operation sequence of print processing using the user authentication function in the second embodiment will be explained with reference to FIG. 19. FIG. 19 is a flowchart showing control procedures to determine the presence or absence of the operation authority according to the second embodiment. The CPU 11 controls the entire following processing by loading, into a RAM 17, a program stored in a ROM 16 and executing the program. In this case, the CPU 11 functions as an analysis unit and determination unit, and the same processing is done in transmitting and receiving multi function peripherals. The same step numbers as those in FIG. 12 denote the same processes, and a description thereof will not be repeated.

If the CPU 11 determines in S401 that a target print job is registered in the job list, it determines in step S601 whether user authentication has normally been performed. If the CPU 11 determines that no user authentication has normally been performed, it advances the process to S402 and shifts to subsequent operation authority control processing. If the CPU 11 determines that user authentication has normally been performed, it determines in step S602, without analyzing the print data processing status, that the printing apparatus has the right to operate the print data. At this time, a job operation from a multi function peripheral other than one which has executed user authentication is prohibited.

When user authentication is performed, an authenticated user is given the right to operate a target print job. However, even when user authentication is performed, the processes in S402 to S406 may also be executed. When the user requests shift of the operation authority via the screen shown in FIG. 18, the operation authority may also be shifted regardless of the print data processing status.

As described above, the printing apparatus according to the second embodiment authenticates an operator. In this case, when authentication is normally done, the print data operation authority is given to a printing apparatus in which authentication has normally been done, regardless of the print data processing status. The printing apparatus may also change the current operation authority when authentication is normally performed. In this way, the printing apparatus can suppress multiple operations and provide a user-friendly operation system.

In the above-described embodiments, a plurality of multi function peripherals execute a print job in cooperation with each other. However, the present invention is not limited to this, and is also applicable to a case where a plurality of multi function peripherals execute a job other than a print job in cooperation with each other.

For example, the present invention can be employed for a transmission job for transmitting image data from the scanner of one job processing apparatus or image data stored in a nonvolatile memory by using the facsimile function or e-mail function of another job processing apparatus.

The present invention is also achieved by supplying a software program for implementing the functions of the above-described embodiments to a system or apparatus directly or from a remote place, and reading out and executing the supplied program by the computer of the system or the like. The form of the invention is not limited to a program as long as the functions of the program can be provided.

Hence, program codes installed in the computer to implement the functions and processes of the present invention also implement the present invention. That is, the claims of the present invention also include the computer program for implementing the functions and processes of the present invention. In this case, the program may take the form of an object code, a program executed by an interpreter, or script data supplied to an OS as long as the functions of the program can be provided.

Examples of the computer-readable storage medium for supplying the program are a floppy disk, hard disk, optical disk, magneto-optical disk, MO, CD-ROM, CD-R, CD-RW, magnetic tape, nonvolatile memory card, ROM, and DVD (DVD-ROM and DVD-R).

The program can also be supplied by connecting to an Internet homepage by using the browser of a client computer, and downloading the program from the homepage to a computer-readable storage medium such as a hard disk. In this case, the computer program of the present invention or a compressed file containing an automatic installing function may also be downloaded. The program can also be supplied by dividing program codes which form the program of the present invention into a plurality of files, and downloading the files from different homepages. That is, a WWW server which allows a plurality of users to download the program files for implementing the functions and processes of the present invention by a computer also falls within the claims of the present invention.

It is also possible to encrypt the program of the present invention, store the encrypted program in a computer-readable storage medium such as a CD-ROM, and distribute the computer-readable storage medium to users. In this case, only a user who satisfies a predetermined condition can download decryption key information from a homepage via the Internet. The user can use the key information to install the encrypted program in the computer so as to be able to execute the program.

Further, the functions of the above-described embodiments can also be implemented in a form other than the one in which the computer executes the readout program to implement the functions of the above-described embodiments. For example, an OS or the like running on the computer can also perform part or all of actual processing on the basis of the instructions of the program, thereby implementing the functions of the above-described embodiments.

The program read out from the computer-readable storage medium may also be written in the memory of a function expansion board inserted into the computer or the memory of a function expansion unit connected to the computer. Based on the instructions of the program, the CPU of the function expansion board or function expansion unit may also perform part or all of actual processing, thereby implementing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-025734 filed Feb. 5, 2008, which is hereby incorporated by reference herein in its entirety.

What is claimed is:

1. A job processing apparatus which executes a cooperation job in cooperation with another job processing apparatus, the job processing apparatus comprising:
   a transmitting unit configured to transmit image data to the another job processing apparatus as a part of the cooperation job;
   an analysis unit configured to analyze a transmitting status of the image data and configured to judge whether or not a transmission of the image data by the transmitting unit has been completed;
   a determination unit configured to, in a case where the analysis unit has judged that the transmission of the image data by the transmitting unit has been completed, determine that it is not possible to accept an operation for the cooperation job via an operation unit, and, in a case where the analysis unit has judged that the transmission of the image data by the transmitting unit has not been completed, determine that it is possible to accept the operation for the cooperation job via the operation unit; and
   a control unit configured to, in a case where the determination unit has determined that it is possible to accept the operation for the cooperation job via the operation unit, permit acceptance of the operation for the cooperation job via the operation unit and, in a case where the determination unit has determined that it is not possible to accept the operation for the cooperation job via the operation unit, restrict acceptance of the operation for the cooperation job via the operation unit.

2. The job processing apparatus according to claim 1, wherein the control unit determines, in accordance with the transmitting status, which of the job processing apparatus and the another job processing apparatus is restricted from accepting the operation for the cooperation job so as to be able to exclusively execute the operation for the cooperation job.

3. The job processing apparatus according to claim 1, wherein the determination unit determines that the job processing apparatus has the operation authority until transmission of the image data has been completed after the cooperation job is generated.

4. The job processing apparatus according to claim 1, further comprising an authentication unit configured to authenticate an operator,
   wherein, when the authentication unit authenticates the operator, the determination unit determines that the job processing apparatus has the operation authority regardless of the transmitting status of the image data.

5. The job processing apparatus according to claim 1, further comprising:
   an authentication unit configured to authenticate an operator; and
   a setting unit configured to display, on a display device of the job processing apparatus, a change screen for changing the operation authority, and to set the operation authority in accordance with information input from the operator via the change screen,
   wherein, when the authentication unit authenticates the operator, the setting unit sets the operation authority to the cooperation job in accordance with an input from the operator.

6. The job processing apparatus according to claim 1, wherein presence or absence of the operation authority to the cooperation job that is analyzed by the analysis unit is displayed on a display device of the job processing apparatus.

7. A method of controlling a job processing apparatus which executes a cooperation job in cooperation with another job processing apparatus, the method comprising:
   transmitting image data to the another job processing apparatus as a part of the cooperation job;
   analyzing a transmitting status of the image data;
   judging whether or not a transmission of the image data has been completed;
   determining, in a case where it is judged that the transmission of the image data has been completed, that it is not possible to accept an operation for the cooperation job;
   determining, in a case where it is judged that the transmission of the image data has not been completed, that it is possible to accept the operation for the cooperation job;
   permitting, in a case where it is determined that it is possible to accept the operation for the cooperation job, acceptance of the operation for the cooperation job; and
   restricting, in a case where it is determined that it is not possible to accept the operation for the cooperation job, acceptance of the operation for the cooperation job.

8. A non-transitory computer-readable storage medium storing a computer-executable program for implementing a method of controlling a job processing apparatus which executes a cooperation job in cooperation with another job processing apparatus, the method comprising:
   transmitting image data to the another job processing apparatus as a part of the cooperation job;
   analyzing a transmitting status of the image data;
   judging whether or not a transmission of the image data has been completed;
   determining, in a case where it is judged that the transmission of the image data has been completed, that it is not possible to accept an operation for the cooperation job;

determining, in a case where it is judged that the transmission of the image data has not been completed, that it is possible to accept the operation for the cooperation job;

permitting, in a case where it is determined that it is possible to accept the operation for the cooperation job, acceptance of the operation for the cooperation job; and restricting, in a case where it is determined that it is not possible to accept the operation for the cooperation job, acceptance of the operation for the cooperation job.

\* \* \* \* \*